United States Patent
Kreidler et al.

(10) Patent No.: US 10,875,053 B2
(45) Date of Patent: Dec. 29, 2020

(54) METHOD FOR MAKING A COMPONENT FOR USE IN AN ELECTRIC MACHINE

(71) Applicant: Regal Beloit America, Inc., Beloit, WI (US)

(72) Inventors: Jason Jon Kreidler, Sheboygan Falls, WI (US); Wesley Kenneth Anderson, Cedarburg, WI (US); Norman Carl Golm, Jr., Fort Wayne, IN (US); Michael A. Logsdon, Wausau, WI (US); Lester Benjamin Manz, Paulding, OH (US); John Sheldon Wagley, Winona Lake, IN (US)

(73) Assignee: REGAL BELOIT AMERICA, INC., Beloit, WI (US)

( * ) Notice: Subject to any disclaimer, the term of this patent is extended or adjusted under 35 U.S.C. 154(b) by 267 days.

(21) Appl. No.: 15/891,422

(22) Filed: Feb. 8, 2018

(65) Prior Publication Data

US 2018/0229264 A1 Aug. 16, 2018

Related U.S. Application Data

(63) Continuation of application No. 14/623,768, filed on Feb. 17, 2015, now Pat. No. 9,919,340.

(Continued)

(51) Int. Cl.

| | | |
|---|---|---|
| *B05D 5/00* | (2006.01) | |
| *H02K 15/02* | (2006.01) | |
| *H02K 15/00* | (2006.01) | |
| *H02K 15/03* | (2006.01) | |
| *H01F 1/28* | (2006.01) | |
| *B22F 3/105* | (2006.01) | |
| *B22F 7/06* | (2006.01) | |

(52) U.S. Cl.
CPC .............. *B05D 5/00* (2013.01); *B22F 3/1055* (2013.01); *B22F 7/06* (2013.01); *H02K 15/00* (2013.01); *H02K 15/02* (2013.01); *H02K 15/03* (2013.01); *H01F 1/28* (2013.01); *Y02P 10/25* (2015.11)

(58) Field of Classification Search
CPC . B05D 5/00; B22F 3/1055; B22F 7/06; H01F 1/28; H02K 15/00; H02K 15/02; H02K 15/03
See application file for complete search history.

(56) References Cited

U.S. PATENT DOCUMENTS

| | | |
|---|---|---|
| 5,598,625 A | 2/1997 | Bluen et al. |
| 6,583,040 B1 | 6/2003 | Lin |

(Continued)

*Primary Examiner* — Minh N Trinh
(74) *Attorney, Agent, or Firm* — Armstrong Teasdale LLP

(57) ABSTRACT

A method for making a component for use in an electric machine is provided. The method includes applying first and second portions of a first material to a first surface, applying a second material to the first portion of first material; bonding the second material to the first portion of the first material, removing the second portion of the first material to form a void defined by the first portion of the first material, applying a conductive material in the void, and applying an insulating layer to the second material, wherein the process for preparing the component further comprising the steps of: applying first and second portions of a third material to the insulating layer; applying a fourth material to the first portion of third material, and bonding the fourth material to the first portion of the third material.

12 Claims, 26 Drawing Sheets

Related U.S. Application Data

(60) Provisional application No. 61/942,735, filed on Feb. 21, 2014.

(56) References Cited

U.S. PATENT DOCUMENTS

| | | |
|---|---|---|
| 7,239,054 B2 | 7/2007 | Takada et al. |
| 8,916,085 B2 | 12/2014 | Jackson et al. |
| 8,922,072 B2 | 12/2014 | Bott et al. |
| 9,327,350 B2 | 5/2016 | Mannella et al. |
| 9,919,340 B2 * | 3/2018 | Kreidler .................. B05D 5/00 |
| 2004/0216301 A1 | 11/2004 | Rowe et al. |
| 2004/0246301 A1 | 12/2004 | Silverbrook |
| 2013/0209739 A1 | 2/2013 | Fruth |
| 2014/0191624 A1 | 7/2014 | Janshan |
| 2015/0244214 A1 | 8/2015 | Kreidler et al. |
| 2015/0318772 A1 | 11/2015 | Janshan |

* cited by examiner

METHOD FOR MAKING A COMPONENT FOR USE IN AN ELECTRIC MACHINE

CROSS REFERENCE TO RELATED APPLICATIONS

This application is continuation application of and claims priority to U.S. application Ser. No. 14/623,768, filed Feb. 17, 2015, for "COMPONENT, ELECTRIC MACHINE AND ASSOCIATED METHOD", which a non-provisional application and claims priority to U.S. Provisional Patent Application 61/942,735 filed Feb. 21, 2014 for "COMPONENT, ELECTRIC MACHINE AND ASSOCIATED METHOD", both of which are hereby incorporated by reference in their entirety.

BACKGROUND OF THE INVENTION

The embodiments described herein relate generally to an electric machine, and more specifically, to an electric machine which includes a component made by a process where magnetically and non-magnetically conductive layers are successively applied to form the component.

An electric machine is typically in the form of an electric generator or an electric motor. Electric machines may be radial flux machines where the flux is generally radial and axial flux machine where the flux is generally axial or a mix of radial and axial flux. As a vast majority of electric machines are radial flux the discussion herein is generally for a radial flux machine. It should be appreciated that axial flux machines and machines that are a mix of radial and axial flux share many of the performance issues of radial flux machines. The machine typically has a centrally located shaft that rotates relative to the machine. Electrical energy applied to coils within the motor initiates this relative motion which transfers the power to the shaft and, alternatively, mechanical energy from the relative motion of the generator excites electrical energy into the coils. For expediency the machine will be described hereinafter as a motor. It should be appreciated that a motor may operate as a generator and vice versa.

A stationary assembly, also referred to as a stator, includes a stator core and coils or windings positioned around portions of the stator core. It is these coils to which energy is applied to initiate this relative motion which transfers the power to the shaft. These coils are formed by winding wire, typically copper, aluminum or a combination thereof, about a central core to form the winding or coil. An electric current is directed through the coils which induces a magnetic field. It is the magnetic field that initiates this relative motion which transfers the power to the shaft.

In an assembled configuration, the coils are positioned in a spaced apart relationship about the stationary assembly that typically has a generally hollow cylindrical configuration with the coils positioned internally. The power of the electric motor is dependent on the amount of energy that may be applied to the coils and that amount of energy is proportional to the amount of wire that may be positioned about the stationary assembly. The amount of wire positioned about the stationary assembly is typically referred to as the slot fill. Placing as much wire in the coils as possible, also known as maximizing the slot fill is thus desirable.

Typically the stator core is made of a magnetically conductive material, typically a ferrous material to assist in strengthening and directing the magnetic field induced by the coils. When the current passes through the coils to induce the magnetic field, eddy currents are generated in the stator core. These eddy currents result in lower machine efficiencies. These currents flow generally in a direction parallel to the shaft of the machine in a radial flux machine. Note that these currents flow generally in a direction perpendicular to the shaft of the machine in an axial flux machine.

To reduce these eddy current losses, rather than have a solid stator core, the stator core typically is designed with a series of parallel plates, typically called laminations, typically stamped from sheet steel. The laminations extend perpendicularly to the shaft. The core is typically produced by stacking a plurality of rigid hollow laminations and joining them to form the rigid hollow cylindrical core. The core is typically produced by stacking a plurality of rigid hollow laminations and joining them to form the rigid hollow cylindrical core.

Typically, the rigid hollow cylindrical core is formed with internal protrusions of teeth around which the coils are wound. One winding method requires the wire to be fed around the teeth with a device called a needle. The need to provide for movement of the needle around the teeth limits the amount of wire that may be used to form the coil. This method is slow and either requires substantial equipment investment and/or substantial labor costs.

Grains in the steel used to make such laminations may be oriented in a desired direction to assist in improving the magnetic field, and the efficiency of the electric machine. Such orientation is limited to a linear direction. While such orienting is helpful, it is suboptimal, because the desired magnetic field direction is a very complex shape.

Transformers and certain sections of electric machines use sheet-steel material or laminations that has highly favorable directions of magnetization along which the core loss is low and the permeability is high. Grains in the steel used to make such laminations may be oriented in a desired direction to assist in improving the magnetic field, and the efficiency of the electric machine. The material with such aligned or oriented grains is termed grain-oriented steel. The reason for this property lies in the atomic structure of the simple crystal of the silicon-iron alloy, which is a body centered cube; each cube has an atom at each corner as well as one in the center of the cube. In the cube, the easiest axis of magnetization is the cube edge, the diagonal across the cube face is more difficult, and the diagonal through the cube is the most difficult. By suitable manufacturing technique, the majority of the cube edges are aligned in the rolling direction to make it a favorable direction of magnetization. The behavior in this direction is superior in core loss and required magnetization to nonoriented steels, so that the oriented steels can be operated at higher flux densities than the nonoriented grades.

The present invention is directed to alleviate at least some of these problems with the prior art.

BRIEF DESCRIPTION OF THE INVENTION

According to an embodiment of the present invention, a component for an electric machine, for example, an interlocking stator, rotor, armature or exciter, for use in an electric machine prepared by a process is provided. The process by which the component is prepared includes the steps of applying a first material to a first portion of a first surface to form a first stator lamination and applying the first material to a second portion of a first surface, spaced from the first portion, to form a first rotor lamination. The process by which the component is prepared further includes the steps of orienting the grains of the first material, applying a second material to the first portion of the first material, applying a second material to the second portion of the first material, and bonding the second material to the first material.

According to an aspect of the present invention, the electric machine is radial flux machine. It should be appreciated that axial flux machines share may benefit from orienting the grains of the material and by manufacture of components by printing thin layers of materials, particularly for stators, rotors, armatures, or exciters.

According to an aspect of the present invention, the process above may further include the step of orienting the grains of the first material, prior to the step of bonding the second material to the first material.

According to another aspect of the present invention, the step of applying a first material to a first surface of the process above may include applying a first material to a first surface in a pattern that provides an aperture in the component.

According to another aspect of the present invention, the step of applying a first material to a first surface of the process above may include orienting the grains of the first material in a pattern selected for use in a switched reluctance electric machine.

According to another aspect of the present invention, the step of applying a first material to a first surface of the process above may include applying the first material with a connecting feature on the periphery thereof adapted for securing a permanent magnet.

According to another aspect of the present invention, the step of bonding the second material to the first material may include surrounding the first material with the second material.

According to a further embodiment of the present invention, a component for use in an electric machine prepared by a process is provided. The process includes the steps of applying a first material to a first surface and orienting the grains of the first material. The process further includes the steps of applying a second material to the first material and bonding the second material to the first material.

According to another aspect of the present invention, the step of applying a first material to a first surface of the process above may further include the step of applying an insulating layer to the second material.

According to another aspect of the present invention, the process for preparing the component may further include the steps of applying a third material to the insulating layer and orienting the grains of the third material. The process for preparing the component may further include the steps of applying a fourth material to the third material and bonding the fourth material to the third material.

According to another aspect of the present invention, the step of applying a first material to a first surface of the process above may include applying the first material in a generally circular shape defined by a first outer diameter and the step of applying the third material may include applying the third material in a generally circular shape defined by a second outer diameter, wherein the first outer diameter and the second outer diameter are different.

According to another aspect of the present invention, the first outer diameter and the second outer diameter are configured to provide a generally frustoconical component.

According to another aspect of the present invention, the step of applying a first material to a first surface of the process above may include applying the first material in a generally circular shape defined by a first inner diameter and the step of applying the third material may include applying the third material in a generally circular shape defined by a second inner diameter, wherein the first inner diameter and the second inner diameter are different and mate with first outer diameter and the second outer diameter, respectively.

According to another aspect of the present invention, the first material and the third material may be substantially the same According to another aspect of the present invention, the second material and the fourth material may be substantially the same According to another aspect of the present invention, the first material may include magnetically conductive particles.

According to another aspect of the present invention, the magnetically conductive particles have a maximum thickness of 0.0010-0.00010 inch in diameter or even much smaller than that. According to another aspect of the present invention, the second component comprises a resin.

According to another aspect of the present invention, the magnetically conductive particles have a maximum thickness of 0.0010-0.250 inch in diameter or even larger than that.

According to another aspect of the present invention, the step of applying the first material to the first surface may be performed by a device capable of applying the first material in a predetermined pattern.

According to another aspect of the present invention, the step of applying the second material to the first material may be performed by a device capable of applying the second material in a predetermined pattern.

According to another aspect of the present invention, the step of orienting the grains of the first material may include orienting the grains in a common direction.

According to another aspect of the present invention, the step of orienting the grains of the first material may include orienting the grains in a diverse direction.

According to another aspect of the present invention, the step of orienting the grains of the first material may include orienting the grains in a direction corresponding to the magnet field pattern of the electric machine.

According to another aspect of the present invention, the electric machine may be one of an electric motor and an electric generator According to another aspect of the present invention, the step of bonding the second material to the first material may include applying at least one of heat, pressure, UV light, air cured adhesive, two part epoxy or anything to secure it, to the second material.

According to another aspect of the present invention, the step of applying a second material to the first material may include applying the second material to only a portion of the first material.

According to another aspect of the present invention, the process for preparing the component may further include the step of removing the portion of the first material to which the second material is not applied.

According to another aspect of the present invention, the step of removing the portion of the first material may include removing the portion with one of a vacuum or a blower.

According to another aspect of the present invention, the process for preparing the component may further include applying a conductive material where the portion of the first material is removed.

According to another aspect of the present invention, the conductive material may include an electrical conduit for use as at least a portion of an electromagnetic coil.

According to a further embodiment of the present invention, a component a method for making a component for use in an electric machine is provided. The method includes the steps of applying a first material to a first surface, orienting the grains of the first material, applying a second material to the first material and bonding the second material to the first material.

According to another aspect of the present invention, the method above may further include the step of applying an insulating layer to the second material.

According to another aspect of the present invention, the method above may further include the steps of applying a third material to the insulating layer, orienting the grains of the third material, applying a fourth material to the third material and bonding the fourth material to the third material.

According to another embodiment of the present invention, a device for providing an oriented field to magnetizable particles is provided. The device includes a cylindrical body having a hollow cylindrical hub extending from the body. The device further includes a first magnetic field producing component operable associated with the hub, a stem extending from the hub; and a second magnetic field producing component operable associated with the stem.

According to another aspect of the present invention, the first magnetic field producing component of the device includes an electromagnet.

According to another aspect of the present invention, the second magnetic field producing component of the device includes an permanent magnet.

According to another embodiment of the present invention, a component for use in an electric machine prepared by a process is provided. The process includes the steps of applying first and second portions of a first material to a first surface, applying a second material to the first portion of first material, bonding the second material to the first portion of the first material, removing the second portion of the first material to form a void defined by the first portion of the first material and applying a conductive material in the void.

According to another aspect of the present invention, the process for preparing the component further includes the step of applying an insulating layer to the second material.

According to another aspect of the present invention, the process for preparing the component further includes the steps of applying first and second portions of a third material to the insulating layer applying a fourth material to the first portion of third material, bonding the fourth material to the first portion of the third material, removing the second portion of the third material to form a void defined by the first portion of the third material and applying a conductive material in the void.

According to another aspect of the present invention, the process for preparing the component further includes the steps of applying an insulating layer to the second material, applying a third material to a first portion of the insulating layer to form a second stator lamination, applying the third material to a second portion of the insulating layer to form a second rotor lamination, applying a fourth material to the first portion of the third material, applying the fourth material to the second portion of the third material, and bonding the fourth material to the third material. The first rotor lamination and the second rotor lamination have at least one of substantially different shapes and substantially different sizes.

According to another aspect of the present invention, the process for preparing the component further includes the first stator lamination and the first rotor lamination defining a first gap therebetween. The second stator lamination and the second rotor lamination define a second gap therebetween. The second gap and the first gap are generally the same.

According to another embodiment of the present invention, an electric machine is provided. The electric machine is prepared by a process including the steps of applying at least one of a plurality of materials to a first surface to form a first electric machine layer and applying at least one of a plurality of materials to a surface of first electric machine layer to form a second electric machine layer.

DETAILED DESCRIPTION OF THE INVENTION

Due to increased customer and industry demands, reduced noise and vibration, lower costs, and improved performance in capacity and efficiency are desirable in the design and manufacture of devices powered by electric motors. The methods, systems, and apparatus described herein facilitate reduced noise and vibration, lower costs, and improved performance in capacity and efficiency for an electric machine. This disclosure provides designs and methods to reduce noise and vibration, lower costs, and improved performance in capacity and efficiency. This disclosure further provides designs and methods to reduce reduced noise and vibration, lower costs, and improved performance in capacity and efficiency.

Technical effects of the methods, systems, and apparatus described herein include at least one of improved performance and quality and reduced labor costs.

Figure 1:
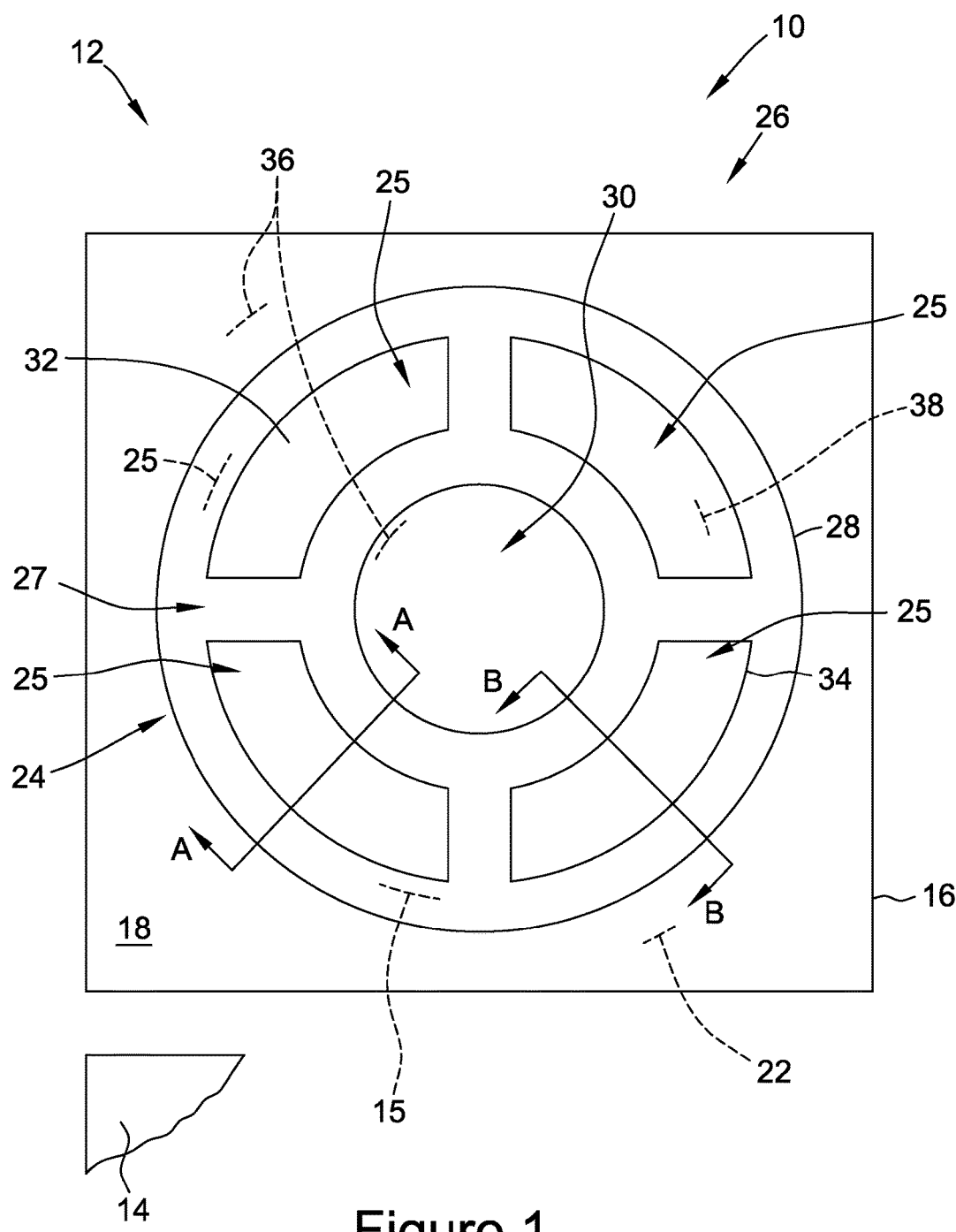
FIG. 1 is a plan view of a stack of laminations used to form a component, according to an embodiment of the present invention.

According to an embodiment of the present invention and referring to FIG. 1, a component 10 for an electric machine 12. The component 10 may, for example, be in the form of a stator, a rotor, an armature or an exciter. The component 10 is prepared by a process. Any suitable equipment may be used to perform the process. For example the process may be performed by a 3-D printer or layer applying device 14 which applies material 15 in layers 16, one at a time, to produce the three dimensional object or component 10 with the 3-D printer 14, which is may be device similar to an inkjet printer. The printer 14 includes a first surface 18 upon which the material 15 is applied.

Any device to apply layers to the surface 18 may be used. For example, the layer applying device 14 may be a robot, a multi-axis positioning device or a manual device operated manually. For example, the layers may be applied using Stereolithography (SLA), Three Dimensional Printing (3DP), Selective Laser Sintering (SLS), Laminated Object Manufacturing (LOM), or Material Subtraction Process.

Figure 1A:
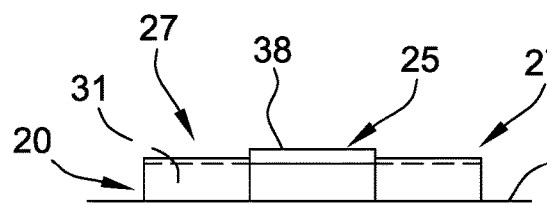
FIG. 1A is a cross sectional view of FIG. 1 along the lines A-A in the direction of the arrows.
Figure 1B:
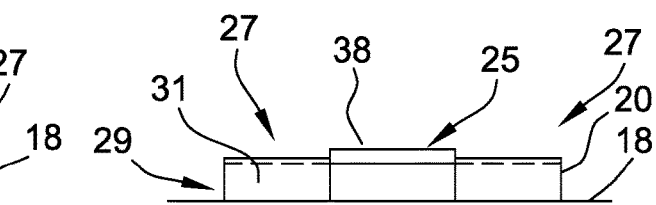
FIG. 1B is a cross sectional view of FIG. 1 along the lines B-B in the direction of the arrows.

Referring now to FIG. 1, FIG. 1A and FIG. 1B, the process by which the component is prepared may include the steps of applying a first material 20 to a first portion 22 of the first surface 18 of printer 14 to form a first layer 24. It should be appreciated that the first surface 18 may include the first portion 22 and a second portion 27. The first material 20 may also be applied to the second portion 27 of the first surface.

While the first portion 22 of the first surface 18 may be the entire first surface, preferably the first portion 22 corresponds to the first layer 24 and corresponds to the shape of component 10 which is made by placing consecutive single layers 16 on top of each other.

The shape of the first material 20 on first portion 22 may be provided by, for example, applying the first material 20 in such shape with the 3D printer 14. Preferably, the entire first surface may receive the first material 20 and a bonding agent 25 may be applied to the first portion 22 of the first surface 18 in the desired shape. Later, the first material 20 located in the second portion 27 may be removed from the first surface 18, resulting in the first material 20 being located in only the first portion 22 and, hence, providing the desired shape and defining a void 29. A different material 31, for example, a conductive material may be applied in the void 29.

As shown in FIG. 1, the shape of the first layer 24 corresponds to the shape of component 10 and may in the shape of a stator, a rotor, an armature or an exciter. For example and as shown in the component 10 of FIG. 1, the first layer 24 is in the shape of a stator 26. The stator 26, as shown, includes a circular periphery 28 and a circular central opening 30.

The first material 20 may, for example, be in the form of ferrite or iron powder. The first material 20 may be magnetically conductive particles. For example, the first material may be graphite particles. Other materials may be used. For example the first material may be Nylon 6/6, ABS, PLA, graphene, carbon fiber, carbon nanotubes, wood pulp and glucose molecules, provided the material is magnetically conductive or that magnetically conductive materials are also included.

If the first material 20 is in the form of magnetically conductive particles, the particles 20 may be any suitable size and may be, for example, be 0.0010-0.00010 inch in diameter or even much smaller than that. Alternatively the particles may be quite large and may be, for example, 0.25-0.001 inch in diameter or even larger The process further includes the step of orienting the grains of the first material 20. Such orienting may provide for orienting the grains in a linear direction, or more preferably, to orient the grains in a pattern 32, for example, in a pattern 32 that corresponds to the optimum magnetic flux pattern for the component.

Grains in the first material 20, in, for example, a silicon-iron alloy, may be oriented in a desired direction to assist in improving the magnetic field, and the efficiency of the electric machine. The first material 20 with such aligned or oriented grains is termed grain-oriented material. The reason for this property to orient the grains in a desired direction lies in the atomic structure of the simple crystal of the silicon-iron alloy, which is a body centered cube; each cube has an atom at each corner as well as one in the center of the cube. In the cube, the easiest axis of magnetization is the cube edge, the diagonal across the cube face is more difficult, and the diagonal through the cube is the most difficult. By the below described manufacturing technique of the present invention, the majority of the cube edges may be aligned into any desired favorable direction of magnetization. The behavior in this direction is superior in core loss and required magnetization to nonoriented materials, so that the oriented materials can be operated at higher flux densities than the nonoriented materials.

To assist in orienting the grains, an electromagnetic coil 34 may be positioned under first surface 18 of 3D printer 14. Alternatively or in addition, an electromagnetic device 36 may be moveably positioned over the first surface 18 of printer 14. The coil 34 and the device 36 may provide a linear electromagnetic field, or preferably and as shown, the coil 34 and the device 36 may provide an electromagnetic field in a pattern to improve the magnetic flux pattern for the component.

Figure 2:
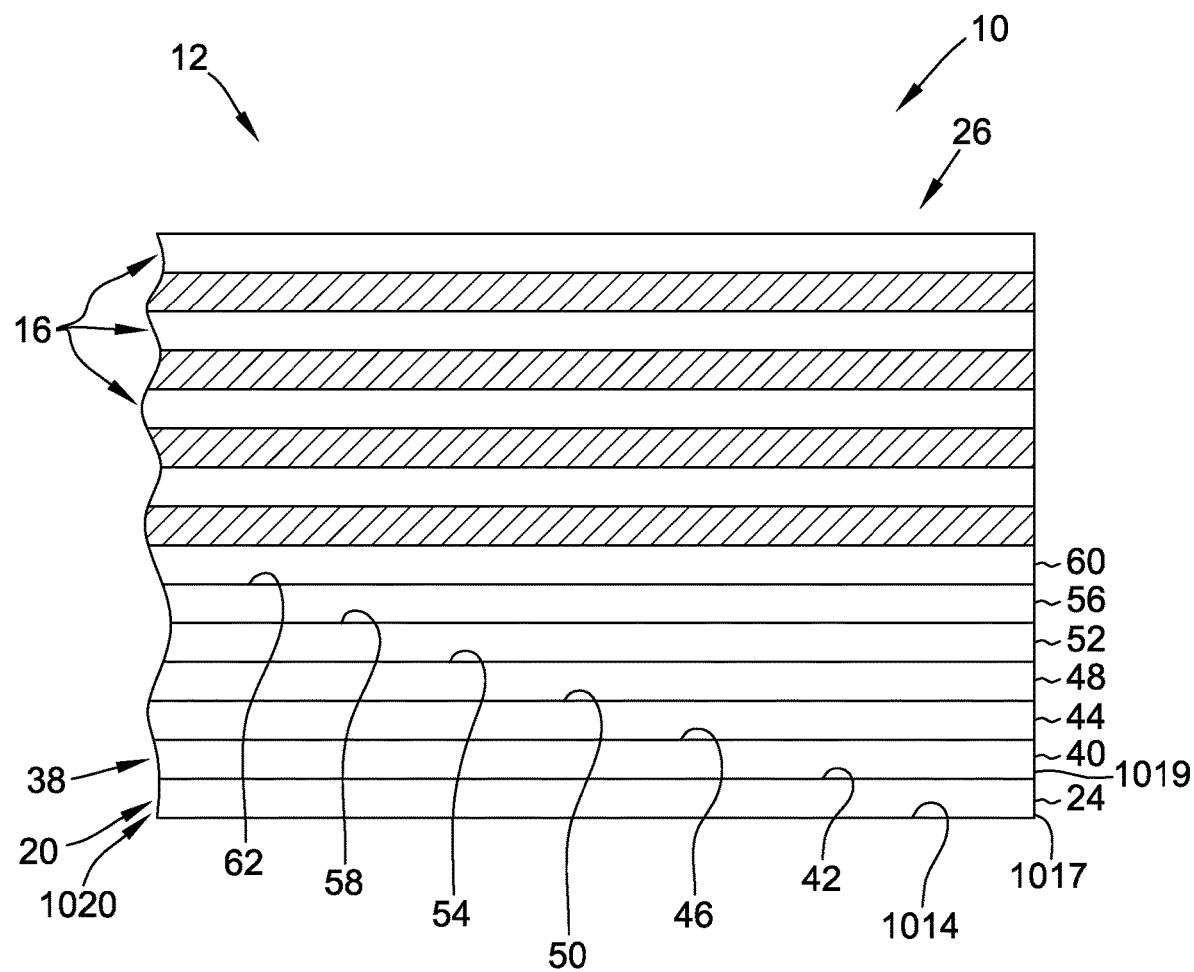
FIG. 2 is an end view of the stack of laminations of FIG. 1.

As shown in FIGS. 1 and 2 the electromagnetic coil 34 includes 4 equally spaced apart coils 34. The coils 34 each have an arcuate shape to generate an arcuate magnetic flux pattern for the component. The coils 34 are spaced below first surface 18 of 3D printer 14.

As will be described in greater detail later, the electromagnetic device 36 may have coils with shapes to generate an optimum magnetic flux pattern for the component. The electromagnetic device 36 may also include a shield to be placed between the magnetic particles and the device 36 when the particles are being oriented to prevent the device from removing the particles from the platen. Such an optimum pattern may provide for a very complicated optimum flux patterns, such as those for switched reluctance electric machines.

A single thickness of magnetically conductive particles may be sufficient for a first layer 24 of magnetically conductive particles 20. It should be appreciated that successive layers of magnetically conductive particles 20 may be applied over the first layer to provide a thicker thickness of magnetically conductive particles. After the first layer 24 has its grains oriented, the first layer 24 may be secured in position by one of a various alternate methods described in greater detail below. The second and subsequent layers would preferably have a shape corresponding to that of the first layer and each such layer would be applied as described above. The second and subsequent layers would be oriented and secured in position by one of a various alternate methods described in greater detail below.

Referring now to FIG. 2, the process may further include the step of applying a second material 38 to be used to secure the first material 20 into a fixed shape. As described above the second material 38 may be the bonding agent 25. The second material 38 may be evenly placed on the first surface 18 or, preferably, the second material 38 may be applied into the shape of the stator 26, while, as described above, the first material 20 is uniformly applied to the entire first surface. It should be appreciated that only the first material 20 or the second material 38 needs be applied in the shape of the stator 26. However, alternatively, both the first material 20 and the second material 38 may be applied in the shape of the stator 26. The first material 20 and the second material 38 may be simultaneously applied and may be so applied in the shape of the stator 26.

Once the second material 38 has been applied, the second material 38 is secured to the first material 20 to secure the first material 20 into a fixed shape. The second material 38 may be any material capable of securing or bonding the first material into a fixed shape. For example, the second material may be an adhesive or a resin. The second material 38 may be activated or cured by, for example, heat, pressure, UV light, air cured adhesive, a two part epoxy or any other suitable material. The second material 38 may be a resin and may be light cured. Typically light cured resin is in liquid form. Some or all of the liquid resin may, when cured, evaporate or may harden into a solid form.

It should be appreciated that the resin may be a powder and preferably have a small particle size. For example the particle size may be 0.0010-0.00010 inch in diameter or even much smaller than that. If the second material 38 is a light cured resin, the resin is light cured to secure or bond the second material 38 to the first material 20.

If the second material 38 is positioned on the entire first surface 18, then the first layer 24, after the second material 38 is secured or cured, extends over the entire first surface. However and as preferred, if the second material 38 is positioned only in a portion of the first surface 18, then that portion will form the first layer 24 in the shape it has been positioned. If positioned in the shape of a stator, then the first layer 24 will be in the shape of a stator 26. For example, if the stator 26 needs an opening 30, then the second material 38 will be missing from that portion of the first surface 18. It should be appreciated that the first material 20 and the second material 38 may be uniformly distributed on the first surface 18 and the curing can be done locally by providing the curing action, the light or the heat etc., to only the portion of the first surface 18 that corresponds to the desired shape of the stator 26. If the second material 38 is not positioned over the entire first surface 18 and/or if only a portion of the second material 38 is cured or activated, the portion of the second material 38 and the first material 20 that is not cured or secured to each other may be removed from the first surface by gravity, a blower or by suction etc.

The second material 38 may surround the first material 20, particularly after being cured. By so surrounding the first material 20, the second material 38 may provide sufficient magnetic insulating properties that a separate boundary layer of the second material 38 above the layer of first material 20 may not be required.

Referring again to FIG. 2, once the first layer 24 has been cured or activated, a second layer 40 is applied to top surface 42 the first layer 24, opposed to first surface 18 of printer 14. The second layer 40 is preferably a magnetically insulating layer to reduce eddy current losses. The second layer 40 may for example be made of a resin. For example and for simplicity the resin of the second layer 40 may be the same resin as that used for the second material 38 to bond or cure the first material 20 to form the first layer 24. For example the second layer 40 may be made of a light cured resin.

The material for the second layer 40 may be applied only to top surface 42 of the first layer 24 and the curing apparatus, light for example, may be generally applied to first or top surface 18 of the printer 14. Alternately material for the second layer 40 may be generally applied to the top surface 18 of the printer 14 and the curing apparatus, light for example, may be applied only to top surface 42 of the first layer 24. Alternately, the material for the second layer 40 may be applied only to top surface 42 of the first layer 24 and the curing apparatus, light for example, may be applied only to top surface 42 of the first layer 24. The portion of the material for the second layer 40 that is not cured may be removed from the printer 14 by gravity, a blower or by suction etc.

Referring again to FIG. 2, once the second layer 40 has been cured or activated, a third layer 44 is applied to top surface 46 of the second layer 40. The third layer 44 is preferably similar or identical to the first layer 24 and is made in a process similar to that by which the first layer 24 is made.

Referring again to FIG. 2, once the third layer 44 has been cured or activated, a fourth layer 48 is applied to top surface 50 of the third layer 44. The fourth layer 48 is preferably similar or identical to the second layer 40 and is made in a process similar to that by which the second layer 40 is made.

Referring again to FIG. 2, once the fourth layer 48 has been cured or activated, a fifth layer 52 is applied to top surface 54 of the fourth layer 48. The fifth layer 52 is preferably similar or identical to the first layer 24 and is made in a process similar to that by which the first layer 24 is made.

Referring again to FIG. 2, once the fifth layer 52 has been cured or activated, a sixth layer 56 is applied to top surface 58 of the fifth layer 52. The sixth layer 56 is preferably similar or identical to the second layer 40 and is made in a process similar to that by which the second layer 40 is made.

Referring again to FIG. 2, once the sixth layer 56 has been cured or activated, a seventh layer 60 is applied to top surface 62 of the sixth layer 56. The seventh layer 60 is preferably similar or identical to the first layer 24 and is made in a process similar to that by which the first layer 24 is made.

Figure 3:
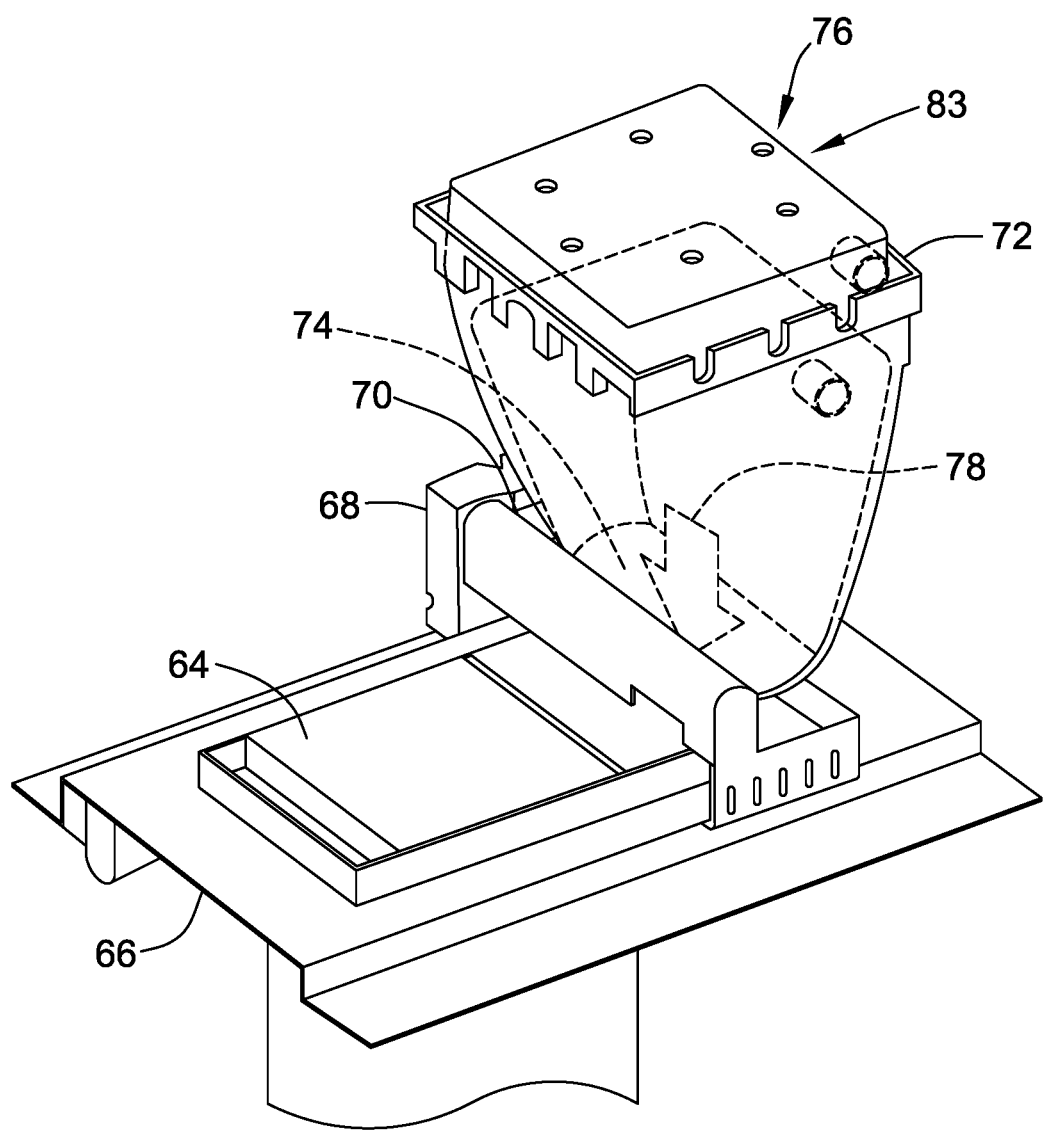
FIG. 3 is a perspective view of a device for use in making the stack of laminations of FIG. 1, according to another embodiment of the present invention.

Referring now to FIGS. 3-6 and according to another embodiment of the present invention, the printer 14 for use in the method of the present invention to make the component of the present invention is shown in greater detail. The printer 14 includes a platen 64 fixedly positioned on a base 66. The printer 14 also includes a carriage 68 having a tray 70 for receiving the selectable one of resin or magnetically conductive particles from hopper or bin 72. The carriage 68 also has a sliding head 74 for dispensing light in the desired position to cure the resin. The hopper 72 may a plurality of compartments (not shown), one compartment for each different material. Alternatively, a plurality of hoppers may be used. Referring now to FIG. 3, the printer 14 is shown in a first position 76 in which the hopper 72 is positioned over tray 70 of carriage 68 to permit the magnetically conductive particles to be released from the hopper 72 to the tray 70 in the direction of arrow 78. It should be appreciated that the hopper 72 may include both the magnetically conductive particles and the resin in different portions or compartments thereof or, alternatively the magnetically conductive particles and the resin may be blended and placed together in the hopper so that they may be simultaneously dispensed.

Figure 4:
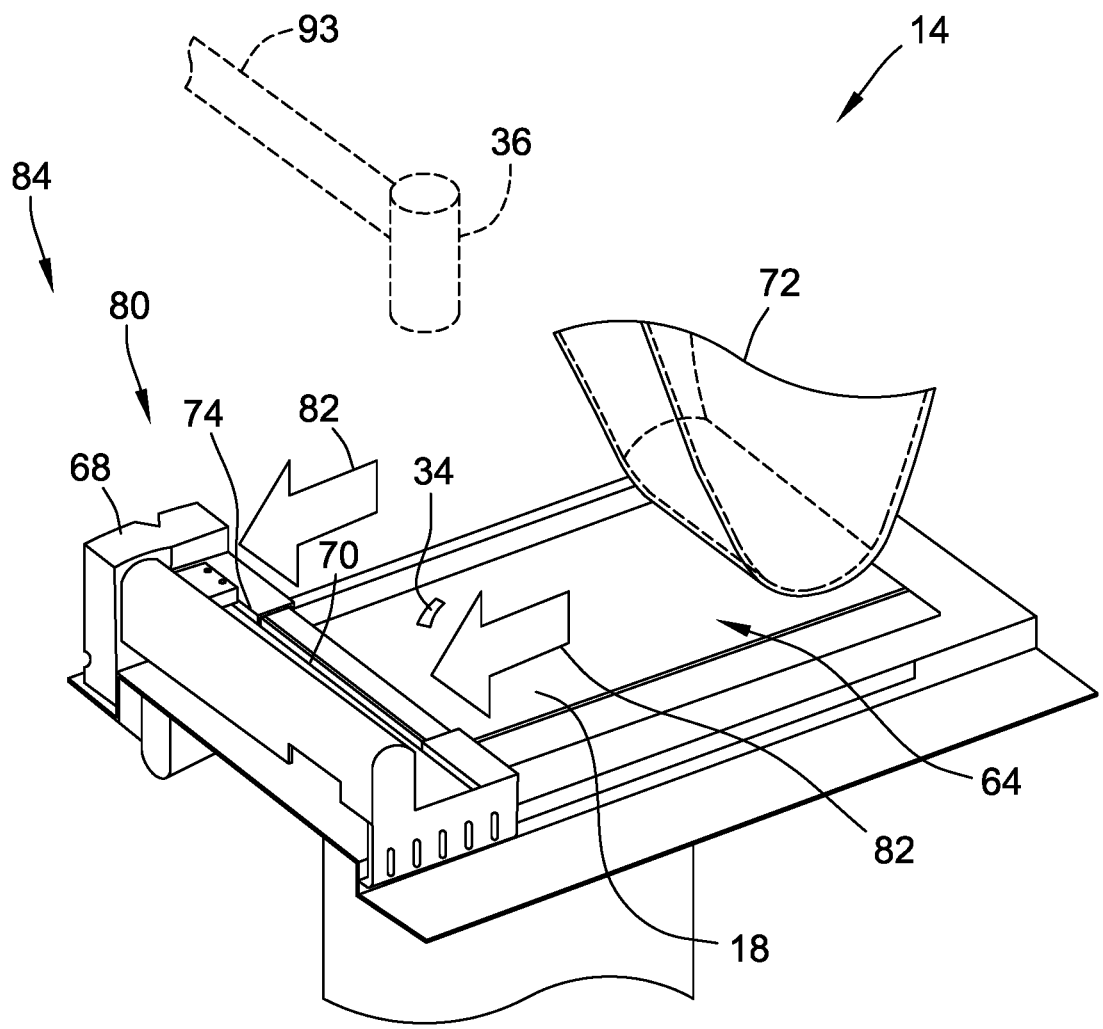
FIG. 4 is a perspective view of the device of FIG. 3 in another position.

Referring now to FIG. 4, the printer 14 is shown in a second position 80 in which the carriage 68 is positioned in its fully extended position away from hopper 72. As the carriage 68 moves from first position 76 to second position 80 in the direction of arrows 82, the carriage 68 passes over top or first surface 18 of platen 64 dispensing the magnetically conductive particles from the tray 70 onto the top surface 18 of platen 64 along its path. It should be appreciated that if the magnetically conductive particles and the resin are blended together in the hopper, the magnetically conductive particles and the resin will be so dispensed from the tray 70.

At this point in the process or a later point, provided the magnetically conductive particles have been dispensed onto the platen 64, the electromagnetic coil 34 under the platen 64 is energized to provide the orientation of the magnetically conductive particles. It should be appreciated that an additional electromagnetic device 36 may be used to provide a more sophisticated orientation of the particles.

Referring again to FIG. 3, the printer 14 is shown in a third position 83 in which the hopper 72 is positioned over tray 70 of carriage 68 to permit the resin to be released from the hopper 72 to the tray 70 in the direction of arrow 78.

Referring again to FIG. 4, the printer 14 is shown in a fourth position 84 in which the carriage 68 is positioned in its fully extended position away from hopper 72. As the carriage 68 moves from first position 76 to second position 80 in the direction of arrows 82, the carriage 68 passes over top surface 18 of platen 64 dispensing the resin from the tray 70 onto the top surface 18 of platen 64 along its path.

Figure 5:
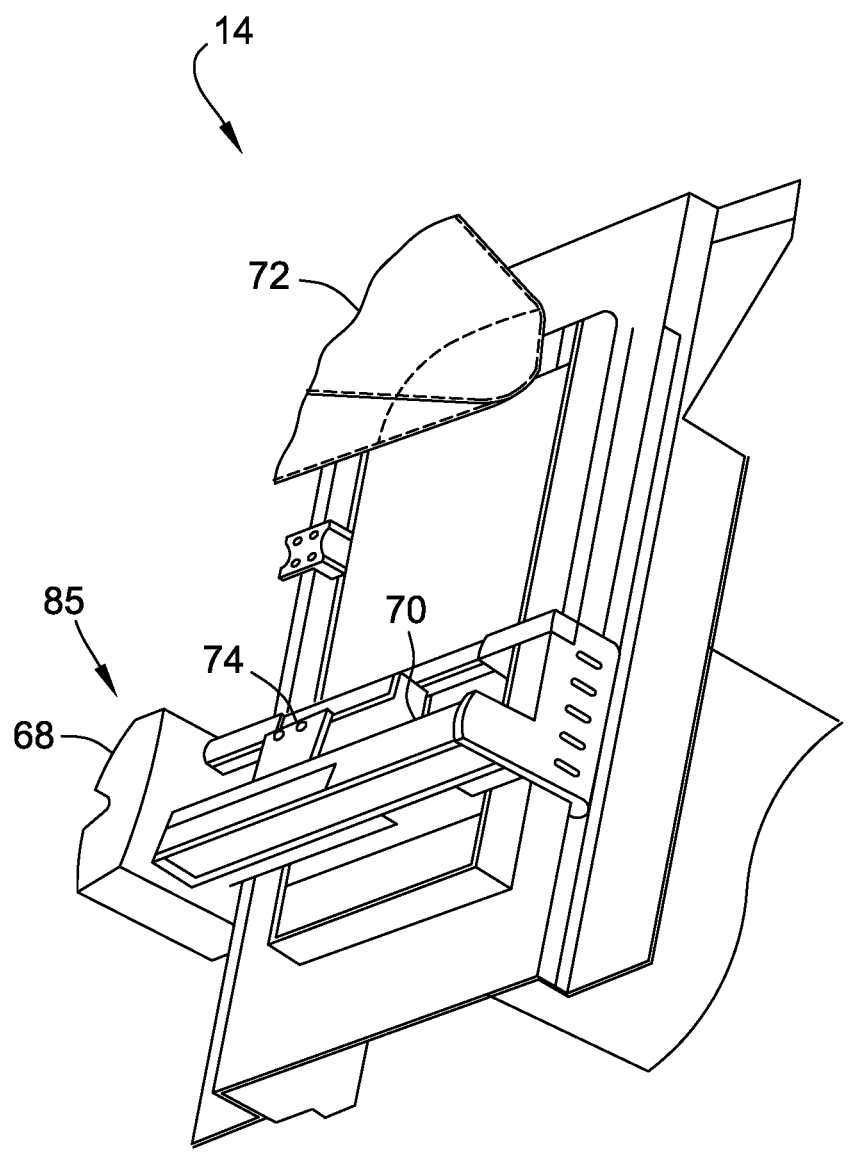
FIG. 5 is a perspective view of the device of FIG. 3 in another position.

Referring now to FIG. 5, the printer 14 is shown in a fifth position 85 in which the carriage 68 is positioned in intermediately away from hopper 72. As the carriage 68 moves over platen 64, light from the head 74 cures the resin and secures the resin to the magnetically conductive particles.

Figure 6:
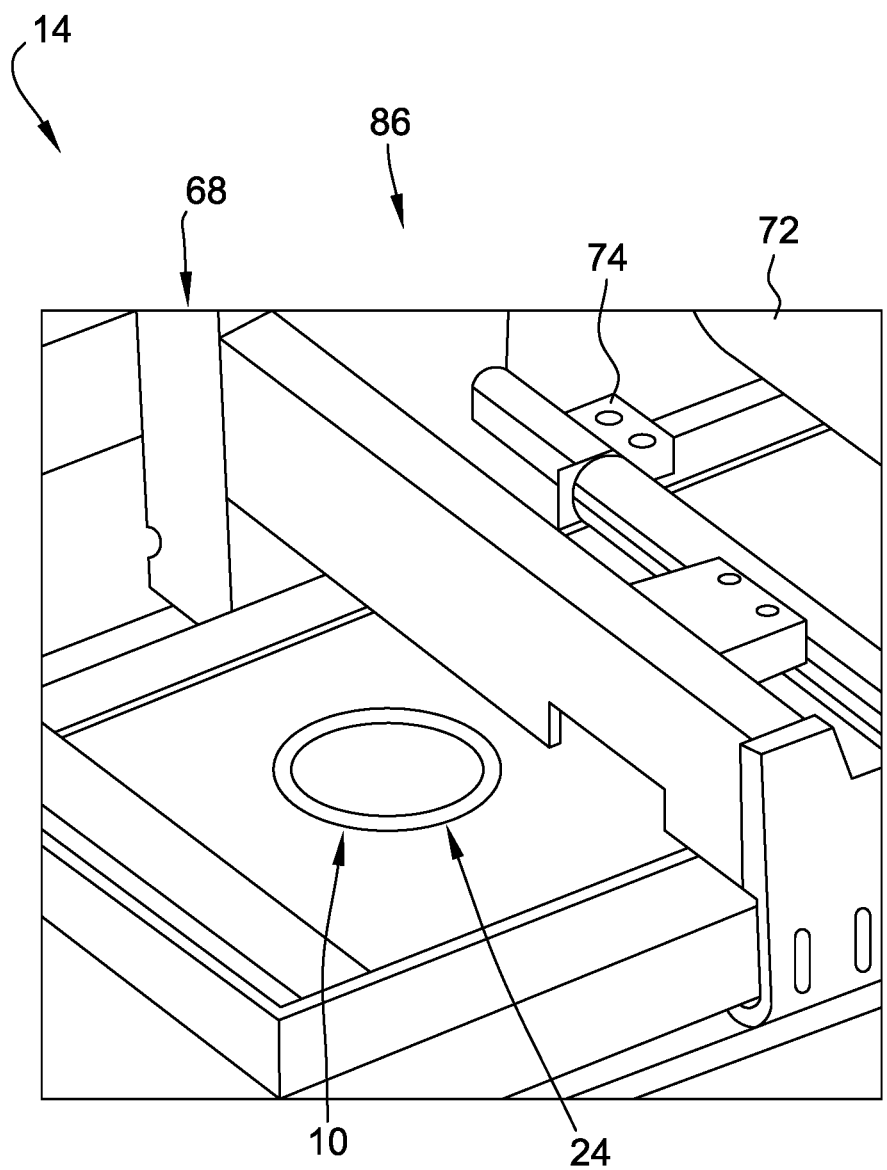
FIG. 6 is a perspective view of the device of FIG. 3 in another position.

Referring now to FIG. 6, the printer 14 is shown in a sixth position 86 in which the carriage 68 is positioned in intermediately away from hopper 72. Note that the carriage 68 has complete its path over platen 64 creating the first layer or lamination 24 of component 10 upon first or top surface 18 of platen 64.

Figure 7:
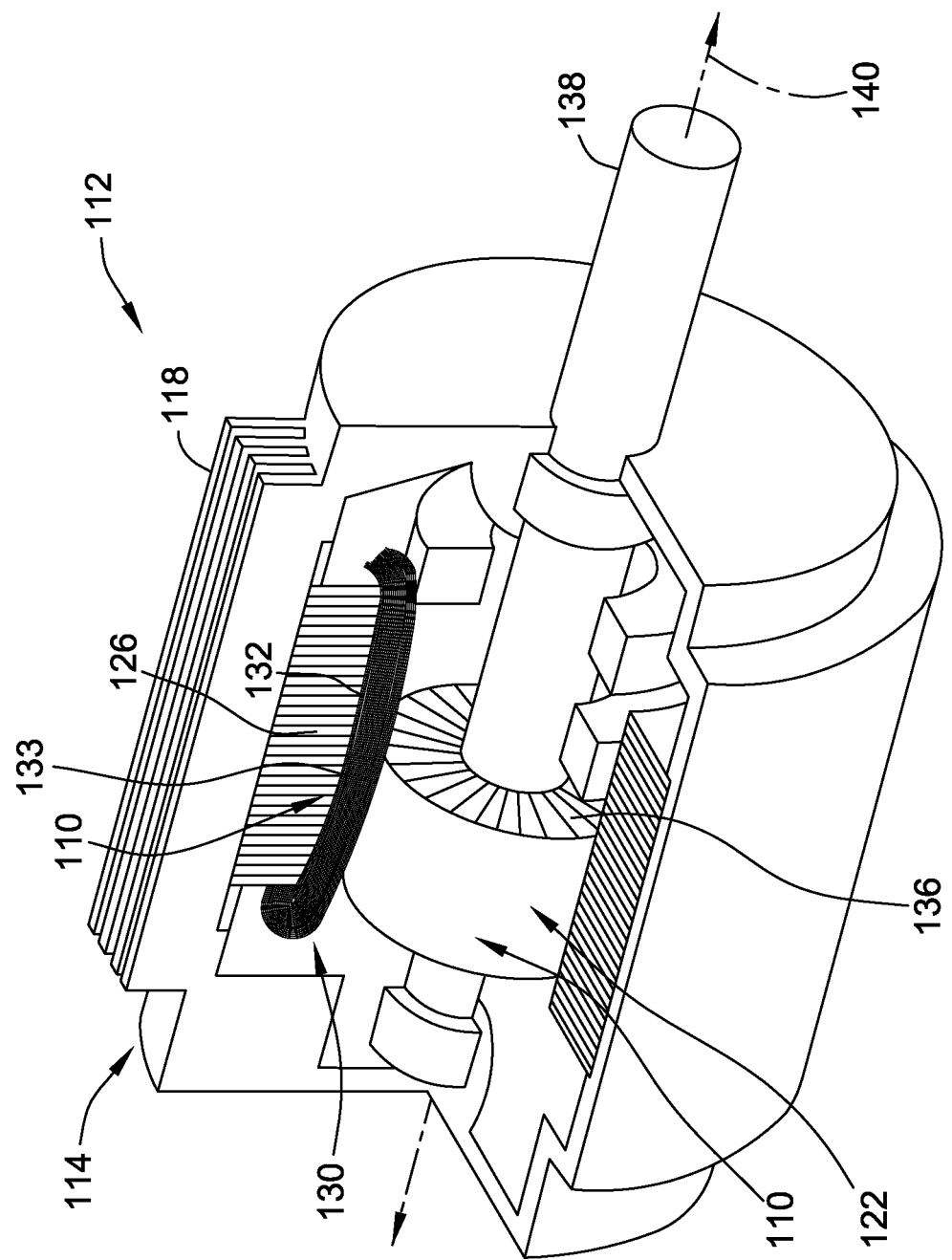
FIG. 7 is a perspective view of another embodiment of the present invention in the form of an electric machine.

Referring now to FIG. 7, a perspective cut-away view of an exemplary electric machine 112 that includes components 110 in the form of a stator core 126 and a rotor core 136. Electric machine 112 also includes a stationary assembly 114, a machine assembly housing 118 and a rotatable assembly 122. The rotatable assembly 122 may include a permanent magnet rotor core 136 and a shaft 138. Machine assembly housing 118 is configured to at least partially enclose and protect stationary assembly 114 and rotatable assembly 122. The stationary assembly 114 includes the stator core 126, which includes a plurality of stator teeth or projections 130. Wire 133 is placed around the stator teeth 130 to form a plurality of windings 132.

According to the present invention, the stator core 126 and/or the rotor core 136 may be made according to the method of applying layers of bonded magnetic particles to layers of insulating material to provide the laminations that form these electric machine components. While both the stator core 126 and the rotor core 136 may be made by applying the layers in the method described above, the embodiment of FIGS. 7-9 provides for a stator core 126 made by the above process and for a rotor core 136 made by traditional methods, such as with stamped laminations.

In an exemplary embodiment, stationary assembly 114 is a three phase salient pole stator assembly. Stator core 126 is formed from a stack of laminations 116 made of a highly magnetically permeable material made by the process described below. The windings 132 are wound on stator core 126 in a manner known to those of ordinary skill in the art. Laminations 116 are applied such that stator core 126 reaches a predefined length. For example, stator core 126 may be formed from a powdered ferrite material or magnetically conductive particles using the above described printing process.

The rotatable assembly 122 is configured to rotate around an axis of rotation 140. In the exemplary embodiment, rotor core 136 is formed from, for example, a stack of stamped laminations made of a magnetically permeable material and is substantially received in a central bore of stator core 126. While FIG. 7 is an illustration of a three phase electric motor, the methods and apparatus described herein may be included within machines having any number of phases, including single phase and multiple phase electric machines.

In the exemplary embodiment, electric machine 112 is coupled to a fan (not shown) for moving air through an air handling system, for blowing air over cooling coils, and/or for driving a compressor within an air conditioning/refrigeration system. More specifically, machine 112 may, be used in air moving applications used in the heating, ventilation, and air conditioning (HVAC) industry, for example, in residential applications using ⅓ horsepower (hp) to 1 hp motors or greater and/or in commercial and industrial applications and hermetic compressor motors used in air conditioning applications using higher horsepower motors, for example, but not limited to using ⅓ hp to 7.5 hp motor or greater. Although described herein in the context of an air handling system, electric machine 112 may engage any suitable work component and be configured to drive such a work component. Alternatively, electric machine 112 may be coupled to a power conversion component, for example, an engine, a wind turbine rotor, and/or any other component configured to rotate rotatable assembly 122 to generate electricity using electric machine 112.

Figure 8:
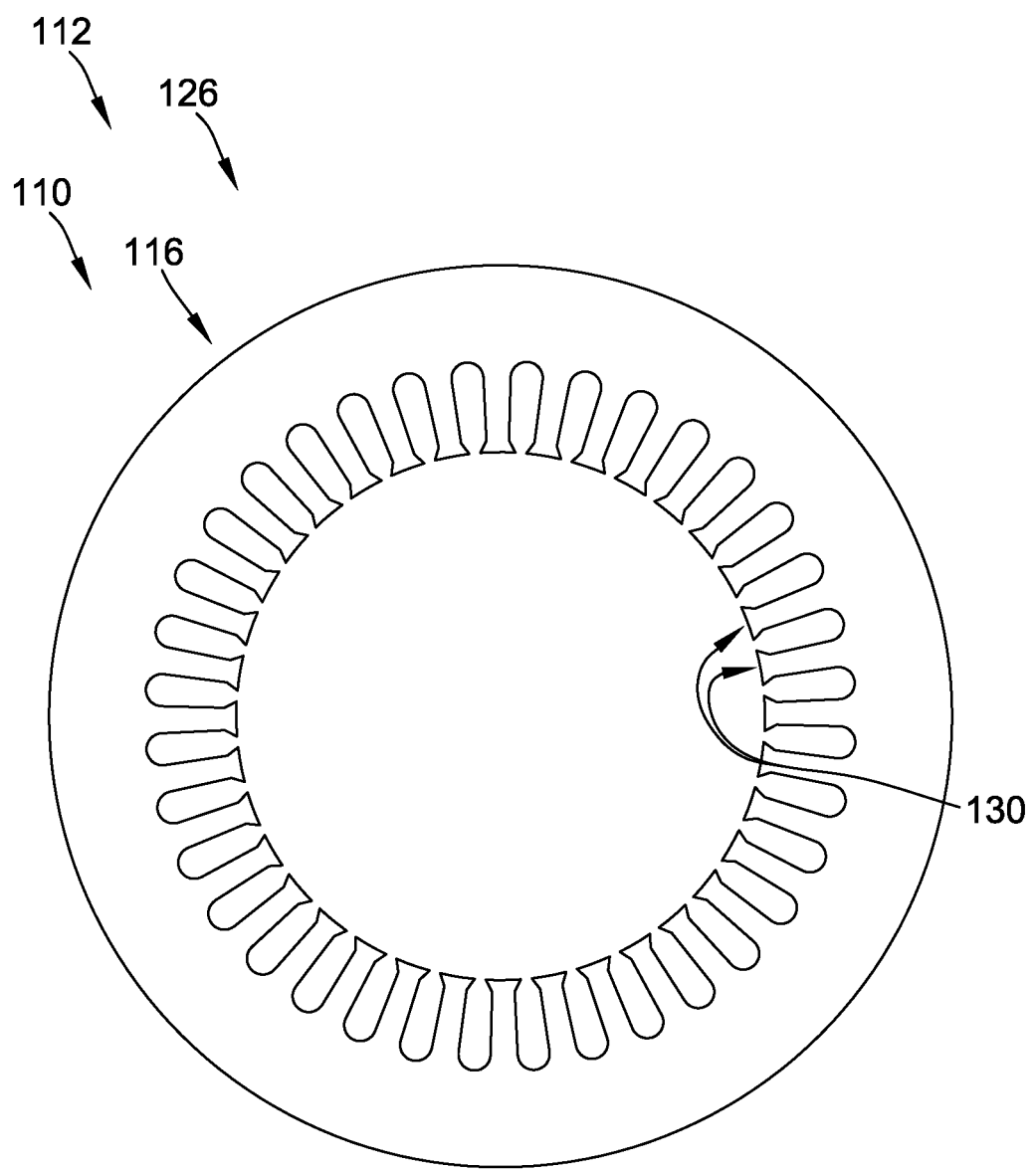
FIG. 8 is a plan view of a stack of laminations for use in a stator for use the electric machine of FIG. 7.

As shown in FIG. 7, the stator core 126 includes a plurality of magnetically conductive layers or stator laminations 116, one of which can be seen in FIG. 8.

Figure 9:
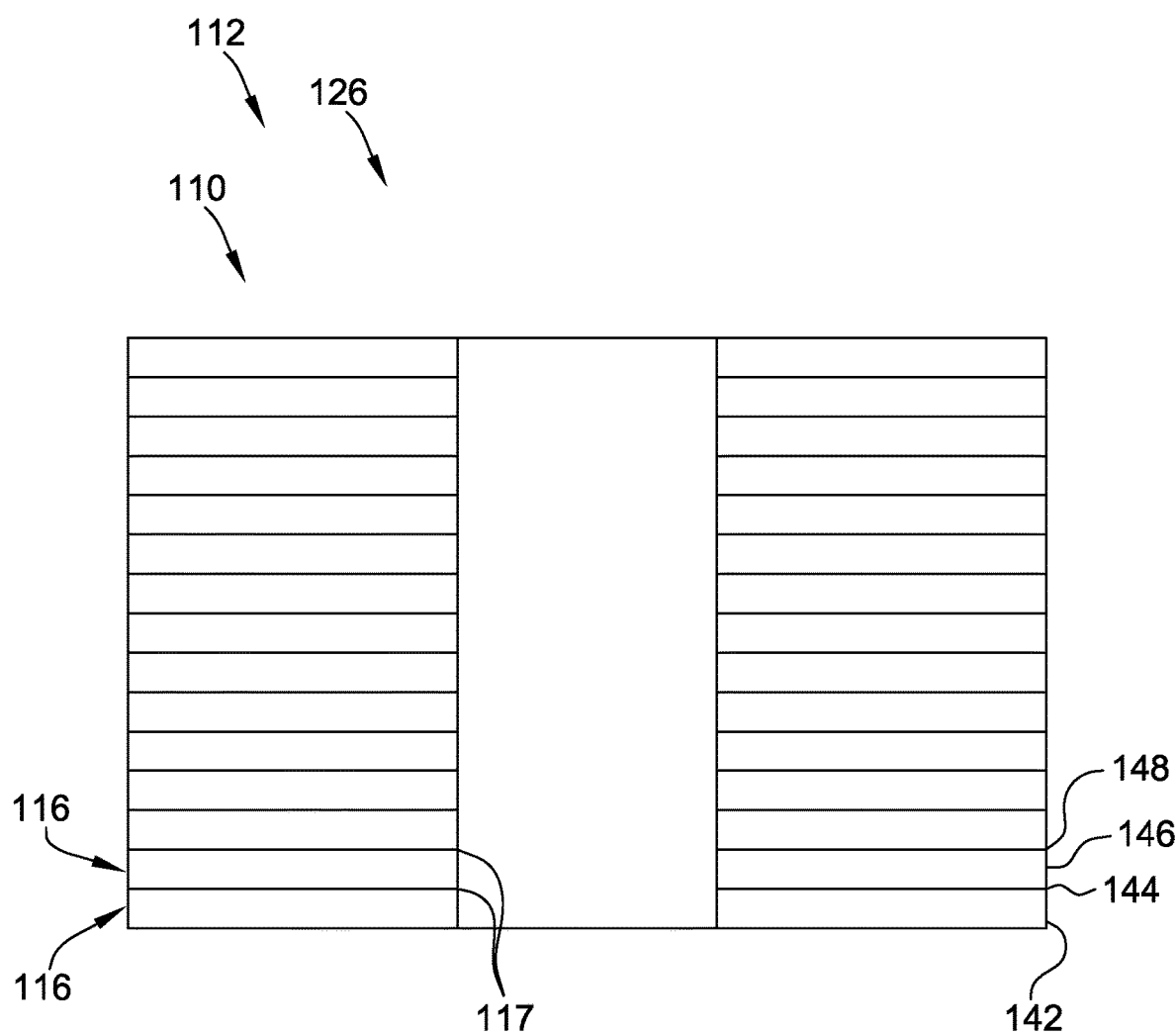
FIG. 9 is an end view of the stack of laminations of FIG. 8.

Referring now to FIG. 9, each of the stator laminations 116 are separated by stator boundary layers 117 (see FIG. 9). The magnetically insulating material may surround the magnetically conductive material, particularly after being cured. By so surrounding the magnetically conductive material, magnetically insulating material may provide sufficient magnetic insulating properties that separate boundary layers of the magnetically insulating material above the magnetically conductive material may not be required.

Similar to the component 10 of FIGS. 1 and 2, a single thickness of magnetically conductive particles may be sufficient for a first stator lamination 142, as shown in FIG. 8. It should be appreciated that successive layers of magnetically conductive particles may be applied over the first layer to provide a thicker thickness of magnetically conductive particles. After the first stator lamination 142 has its grains oriented, the first stator lamination 142 would be secured in position by one of a various alternate methods described above.

Referring again to FIG. 9, after the first stator lamination 142 is secured in position, a first stator boundary layer 144 is applied onto the first stator lamination 142. Once the first stator boundary layer 144 has been applied, the first stator boundary layer 144 is secured to the first stator lamination 142. The first stator boundary layer 144 is preferably a magnetically insulating layer to reduce eddy current losses.

Continuing to refer to FIG. 9, once the first stator boundary layer 144 has been cured or activated, a second stator lamination 146 is applied to the first stator boundary layer 144. The second stator lamination 146 is preferably similar or identical to the first stator lamination 142 and is made in a process similar to that by which the first stator lamination 142 is made.

Once the second stator lamination 146 has been cured or activated, a second stator boundary layer 148 is applied to the second stator lamination 146. The second stator boundary layer 148 is preferably similar or identical to the first stator boundary layer 144 and is made in a process similar to that by which the first stator boundary layer 144 is made. This process is repeated until enough stator laminations 116 separated by stator boundary layers 117 are made to provide a stator core 126 of sufficient length. The magnetically insulating material may surround the magnetically conductive material, particularly after being cured. By so surrounding the magnetically conductive material, magnetically insulating material may provide sufficient magnetic insulating properties that separate boundary layers of the magnetically insulating material above the magnetically conductive material may not be required.

Referring again to FIG. 8, the stator core 126 may include the plurality of spaced apart teeth 130 which form slots 150 between adjacent teeth 130.

In the electric machine 112 of FIGS. 7-9, the slots 150 in the stator core 126 remain as voids when the stator core 126 is completed. After the stator core 126 is completed wire 133 (see FIG. 7) is wound around the teeth 130 to form coils 132 (see FIG. 7).

Some electric machines, particularly generators, include an exciter stator (not shown). It should be appreciated that the exciter stator may be printed, one lamination at a time, right inside the stator core 126.

Figure 10:
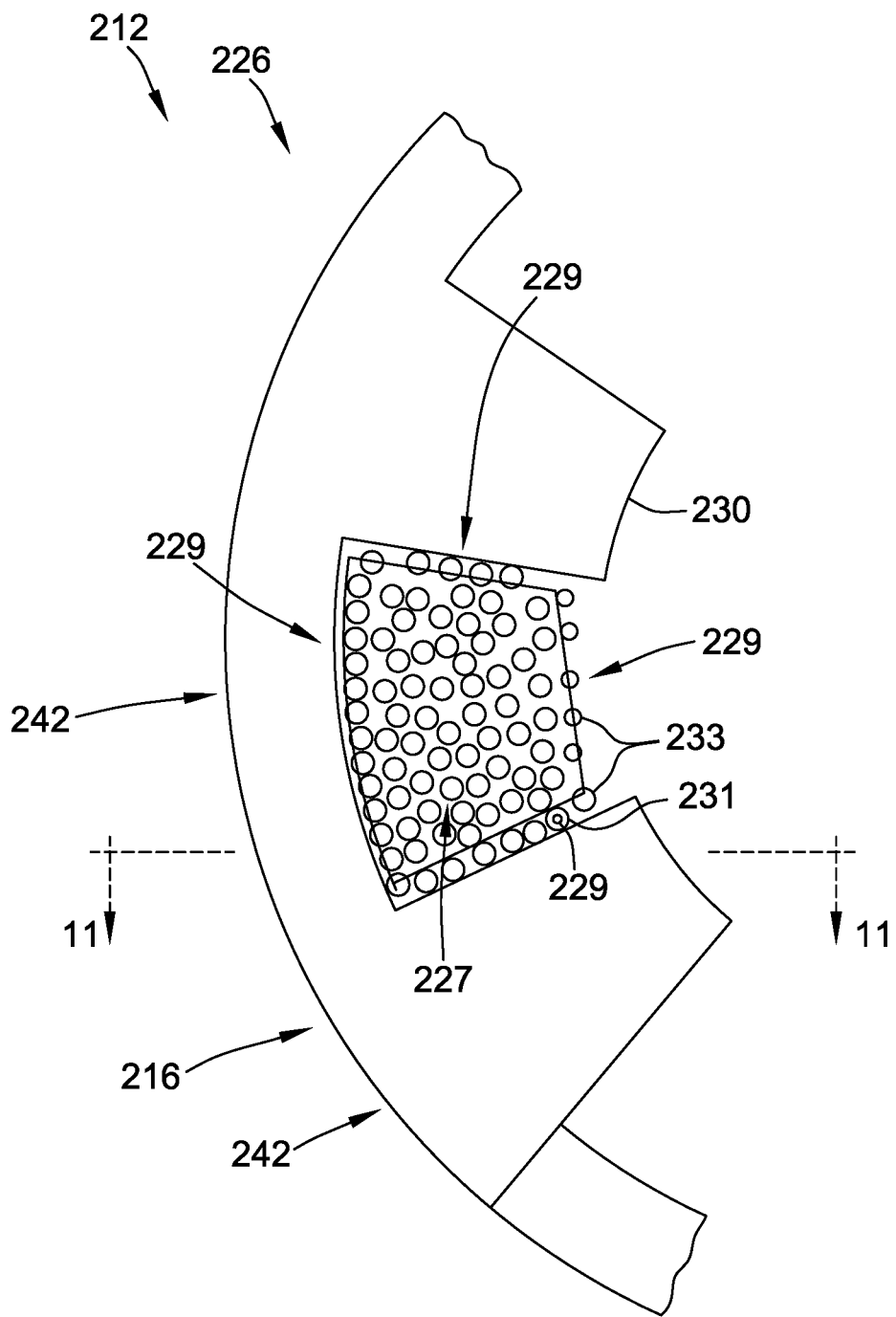
FIG. 10 is a partial plan view of another embodiment of the present invention in the form of a component having electrically conductive material printing therein, according to an embodiment of the present invention.
Figure 11:
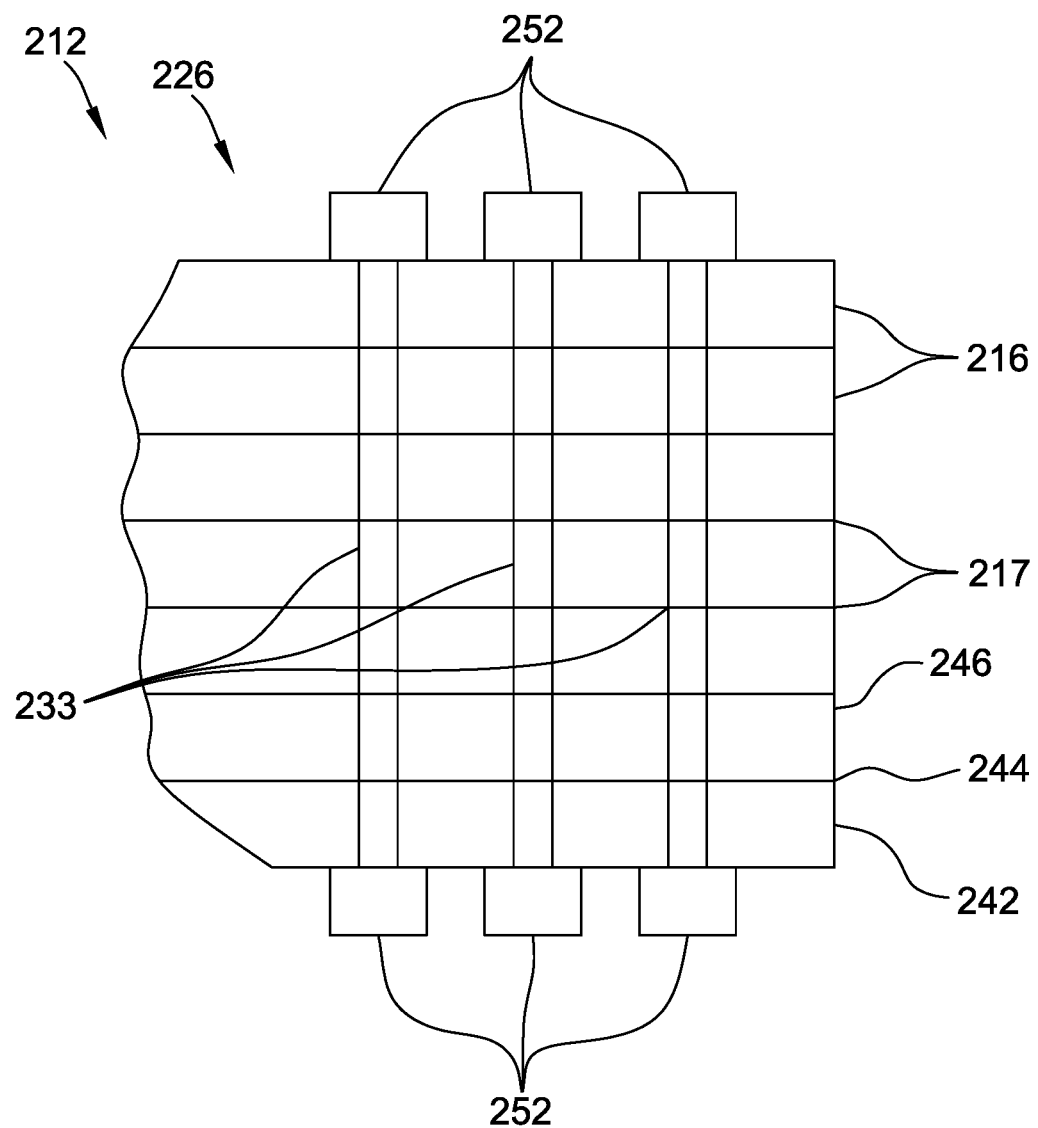
FIG. 11 is a cross sectional view of the device of FIG. 10 along the line 11-11 in the direction of the arrows.

Referring now to FIGS. 10-11 and according to another embodiment of the present invention, a portion of an electric machine 212 is shown. The electric machine 212 is similar to electric machine 112 of FIGS. 7-9 except electric machine 212 includes a stator core 226 that is different than stator core 126 of electric machine 112. Rather than requiring that wire be wound around the teeth of the stator core to provide the coils, as in the machine 112 of FIGS. 7-9, in the stator core 226 of machine 212 of FIGS. 10-11, at least a portion of coils 232 are printed into the stator core 226.

Similar to the stator core 126 of electric machine 112 of FIGS. 7-9, the stator core 226 is made by printing with, for example, a 3D printer. The stator core 226 includes a plurality of magnetically conductive layers or stator laminations 216, a portion of one of which can be seen in FIG. 10.

Referring again to FIG. 11, each of the stator laminations 216 are separated by stator boundary layers 217, similar to the stator boundary layers 117 of machine 112 (see FIG. 9). The magnetically insulating material may surround the magnetically conductive material, particularly after being cured. By so surrounding the magnetically conductive material, magnetically insulating material may provide sufficient magnetic insulating properties that separate boundary layers of the magnetically insulating material above the magnetically conductive material may not be required.

The stator laminations 216 may be made using the magnetic field orientation process used in making stator laminations 116 of the stator core 126 of FIGS. 7-9 or the stator laminations 216 may not be made with the particles having a magnetic field orientation at all. The benefits of printing coils 232 into the stator core 226 may be greater than the benefits of providing magnetic field orientation in some applications.

Similar to the component 110 of FIGS. 7-9, a single thickness of magnetically conductive particles may be sufficient for a first stator lamination 242 of FIG. 10. It should be appreciated that successive layers of magnetically conductive particles may be applied over the first layer to provide a thicker thickness of magnetically conductive particles. After the first stator lamination 242 has its grains oriented, the first stator lamination 242 may be secured in position by one of a various alternate methods described above.

As shown in FIG. 10, a void or slot 250 is provided between adjacent teeth 230 of the first stator lamination 242. A combination of electrically conductive material and electrically insulating material may be formed in the slot 250 to provide for electric conduits 233 to form at least a portion of coils 232 in the lamination 242. The electric conduits 233 may be provided in a similar fashion as the layers 16 of the component 10 are formed by printer 16 as described above and as shown in FIGS. 1-6. The electrical conduits may be made of any electrically conductive material, for example aluminum or copper or a combination of copper and aluminum. For example the conduits 233 may include outer periphery conduits 225 that are made of copper and inner conduits 227 made of aluminum. Further some or all of the conduits may include a core 229 of aluminum and an outer surface 231 of copper. It should be appreciated that the electric conduits 233 may have varying characteristics with the central portions made of different material and/or of different diameters. Further, the conduits 233 may be densely packed at some locations and more loosely packed at others. For example, the outer periphery conduits 225 may be densely packed and the inner conduits 227 more loosely packed. For example, the outer periphery conduits 225 may be larger in diameter and the inner conduits 227 more smaller in diameter. For example, the conduits 233 may be larger in diameter in the middle of the coil and the conduits 233 may be smaller in diameter in the ends of the coil.

For example and referring again to FIG. 3, the printer 14 may include an additional portion (not shown) of hopper 72 for receiving electrically conductive material in the form of, for example, a powder. The printer 14 is shown in a first position 76 in which the hopper 72 is positioned over tray 70 of carriage 68 to permit the electrically conductive material to be released from the hopper 72 to the tray 70 in the direction of arrow 78. It should be appreciated that the hopper 72 may include both the electrically conductive material and the resin in different portions or compartments thereof or, alternatively the electrically conductive material and the resin may be blended and placed together in the hopper so that they may be simultaneously dispensed.

Referring again to FIG. 4, the printer 14 is shown in second position 80 in which the carriage 68 is positioned in its fully extended position away from hopper 72. As the carriage 68 moves from first position 76 to second position 80 in the direction of arrows 82, the carriage 68 passes over top surface 18 of platen 64 dispensing the electrically conductive material from the tray 70 onto the top surface 18 of platen 64 along its path. It should be appreciated that if the electrically conductive material and the resin are blended together in the hopper 72, the electrically conductive material and the resin will be so dispensed from the tray 70.

Referring again to FIG. 3, the printer 14 is shown in third position 83 in which the hopper 72 is positioned over tray 70 of carriage 68 to permit the resin to be released from the hopper 72 to the tray 70 in the direction of arrow 78.

Referring again to FIG. 4, the printer 14 is shown in fourth position 84 in which the carriage 68 is positioned in its fully extended position away from hopper 72. As the carriage 68 moves from first position 76 to second position 80 in the direction of arrows 82, the carriage 68 passes over top surface 18 of platen 64 dispensing the resin from the tray 70 onto the top surface 18 of platen 64 along its path.

Referring again to FIG. 5, the printer 14 is shown in a fifth position 85 in which the carriage 68 is positioned in intermediately away from hopper 72. As the carriage 68 moves over platen 64, light from the head 74 cures the resin and secures the resin to the electrically conductive material. The resin may evaporate, particularly if in a liquid form, such that the electrically conductive properties of the electrically conductive material is sufficient for the application. The light may also cure other resin in portions of the slot 250 (see FIG. 10) where the electrically conductive material has not been dispensed. This other resin may not evaporate and may remain to provide for insulation to the electric conduits 233.

Referring again to FIG. 11, after the first stator lamination 242 is secured in position, a first stator boundary layer 244 is applied onto the first stator lamination 242. Once the first stator boundary layer 244 has been applied, the first stator boundary layer 244 is secured to the first stator lamination 242. The first stator boundary layer 244 is preferably a magnetically insulating layer to reduce eddy current losses.

Continuing to refer to FIG. 11, once the first stator boundary layer 244 has been cured or activated, a second stator lamination 246 is applied to the first stator boundary layer 244. The second stator lamination 246 is preferably similar or identical to the first stator lamination 242 and is made in a process similar to that by which the first stator lamination 242 is made.

Once the second stator lamination 246 has been cured or activated, a second stator boundary layer 248 is applied to the second stator lamination 246. The second stator boundary layer 248 is preferably similar or identical to the first stator boundary layer 244 and is made in a process similar to that by which the first stator boundary layer 244 is made. This process is repeated until enough stator laminations 216 separated by stator boundary layers 217 are made to provide a stator core 226 of sufficient length. The magnetically insulating material may surround the magnetically conductive material, particularly after being cured. By so surrounding the magnetically conductive material, magnetically insulating material may provide sufficient magnetic insulating properties that separate boundary layers of the magnetically insulating material above the magnetically conductive material may not be required.

As shown in FIG. 11, the stator core 226 may include connections 252 to connect the electric conduits to form the coils. Wires or conduits 235 may be connected to the connections 252 to complete the coils using conventional motor fabricating technology.

Figure 12:
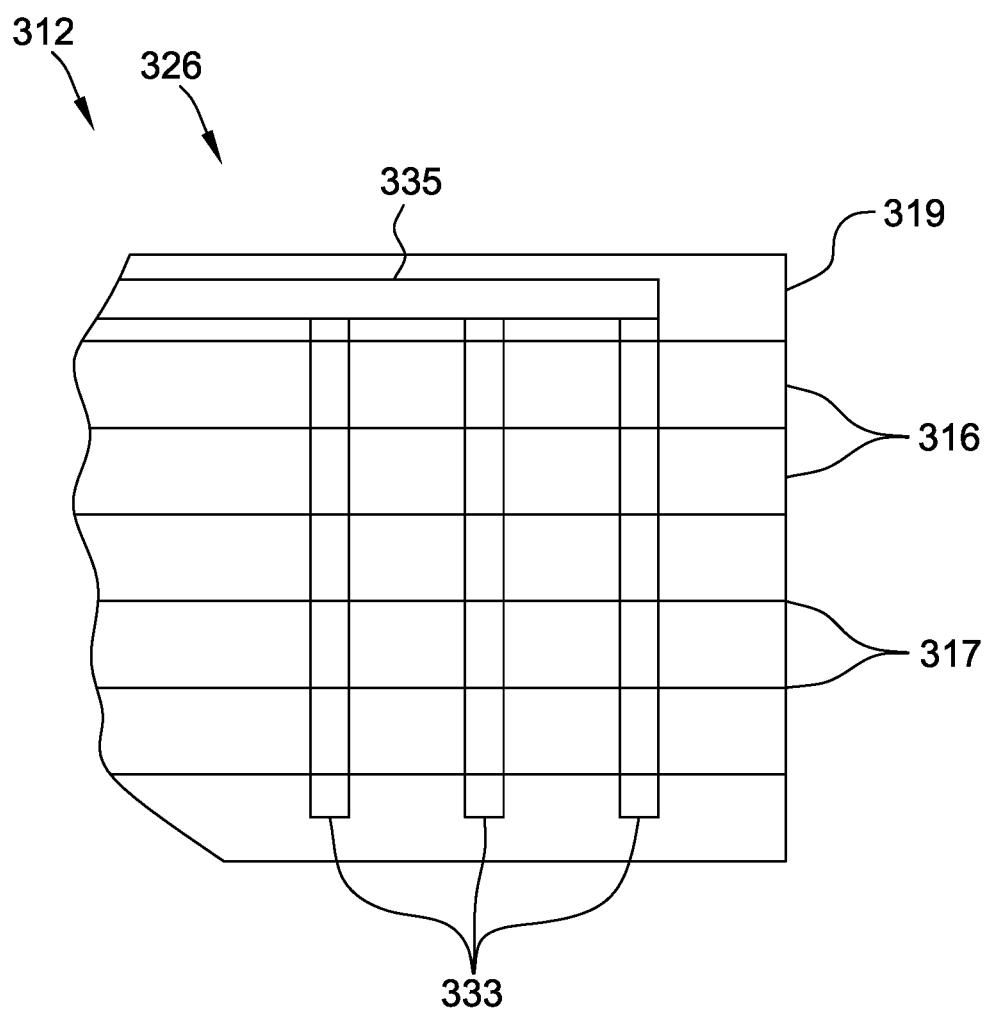
FIG. 12 is a partial plan view in cross section of a component with electrically conductive material that provides for imbedded crossover wires in an end lamination, according to another embodiment of the present invention.

Referring now to FIG. 12 and according to another embodiment of the present invention, a portion of an electric machine 312 is shown. The electric machine 312 is similar to electric machine 212 of FIGS. 10-11 except electric machine 312 includes a stator core 326 that is different than stator core 226 of electric machine 212. Rather than requiring that connections 252 be placed on ends of the stator core 226 and wires or conduits 235 be connected to the connections 252 to complete the coils using conventional motor fabricating technology, as in core 226 of machine 212 of FIGS. 10-11, the stator core 326 provides for internal conduits 335 complete the coils 332.

As shown in FIG. 12, the stator core 326, in a manner similar to stator core 226 of FIGS. 10-11, is made by printing with, for example, a 3D printer. The stator core 326 includes a plurality of magnetically conductive layers or stator laminations 316 similar to the stator laminations 216 of machine 212 (see FIG. 11). The stator laminations 316 include electric conduits 333 similar to the electric conduits 233 of machine 212 (see FIG. 11). It should be appreciated that each of the stator laminations 316 are separated by stator boundary layers 317 (see FIG. 12), similar to the stator boundary layers 217 of machine 212 (see FIG. 11). The magnetically insulating material may surround the magnetically conductive material, particularly after being cured. By so surrounding the magnetically conductive material, magnetically insulating material may provide sufficient magnetic insulating properties that separate boundary layers of the magnetically insulating material above the magnetically conductive material may not be required.

As shown in FIG. 12, an end lamination 319 of the stator laminations 316, includes internal conduits 335 that form crossover wires to complete the coils 332. The internal conduits 335 may be formed in a similar matter to that by which the electric conduits 233 of machine 212 are formed (see FIG. 9).

Figure 13:
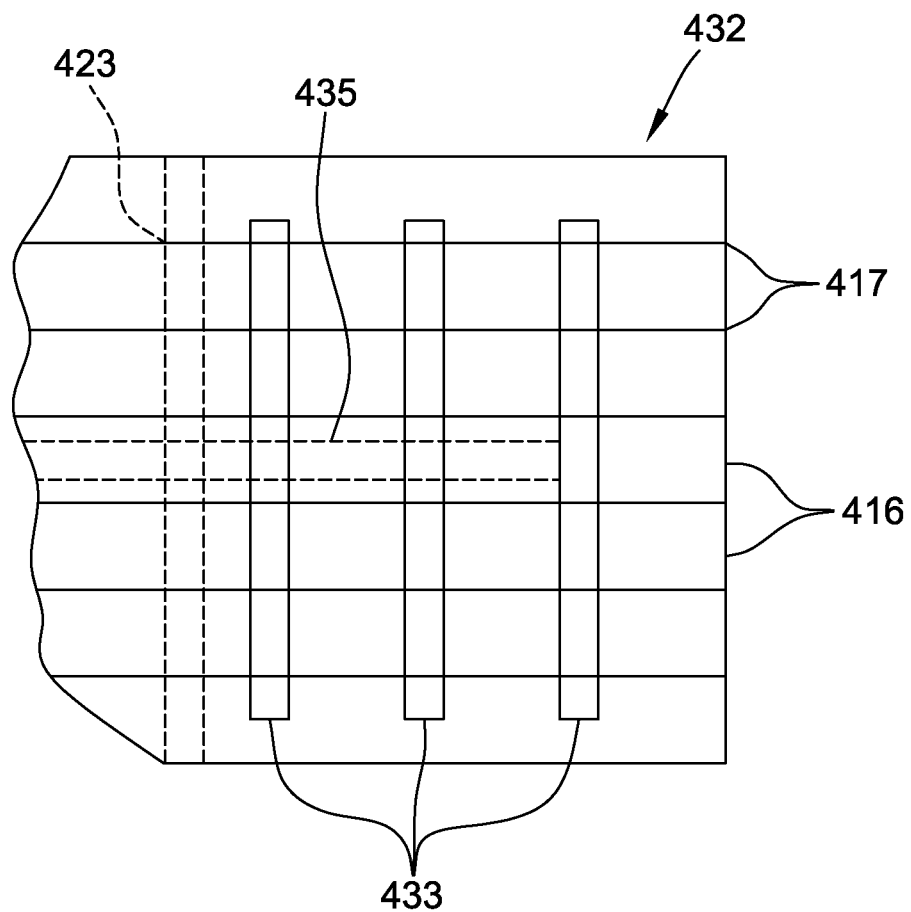
FIG. 13 is a partial plan view in cross section of a component with electrically conductive material that provides for imbedded crossover wires in an internal lamination, according to another embodiment of the present invention.

Referring now to FIG. 13 and according to another embodiment of the present invention, a portion of an electric machine 412 is shown. The electric machine 412 is similar to electric machine 312 of FIG. 12 except electric machine 412 includes a stator core 426 that is different than stator core 326 of electric machine 312. Rather than requiring that internal conduits 335 be placed on end lamination 319 of the stator core 326 of machine 312 of FIG. 12, the stator core 326 of FIG. 13 provides placing internal conduits 435 in internal lamination 421 of the stator core 426.

As shown in FIG. 13, a stator core 426, in a manner similar to stator core 326 of FIG. 12, is made by printing with, for example, a 3D printer. The stator core 426 includes a plurality of magnetically conductive layers or stator laminations 416 similar to the stator laminations 316 of machine 312 (see FIG. 12). The stator laminations 416 include electric conduits 433 similar to the electric conduits 333 of machine 312 (see FIG. 12). Each of the stator laminations 416 may be separated by stator boundary layers 417 (see FIG. 13), similar to the stator boundary layers 317 of machine 312 (see FIG. 12). The magnetically insulating material may surround the magnetically conductive material, particularly after being cured. By so surrounding the magnetically conductive material, magnetically insulating material may provide sufficient magnetic insulating properties that separate boundary layers of the magnetically insulating material above the magnetically conductive material may not be required.

As shown in FIG. 13, the internal lamination 421 of the stator laminations 416, includes the internal conduits 435 that form crossover wires to complete coils 432. The internal conduits 435 may be formed in a similar matter to that by which the electric conduits 333 of machine 312 are formed (see FIG. 12).

As shown in FIG. 13, the internal lamination 421 of the stator laminations 416, may further include the internal passageways 423 formed during the 3D printing process. The internal passageways 423 may permit a fluid, for example oil, water, or air, to flow through the passageways 423 to cool the laminations.

Figure 14:
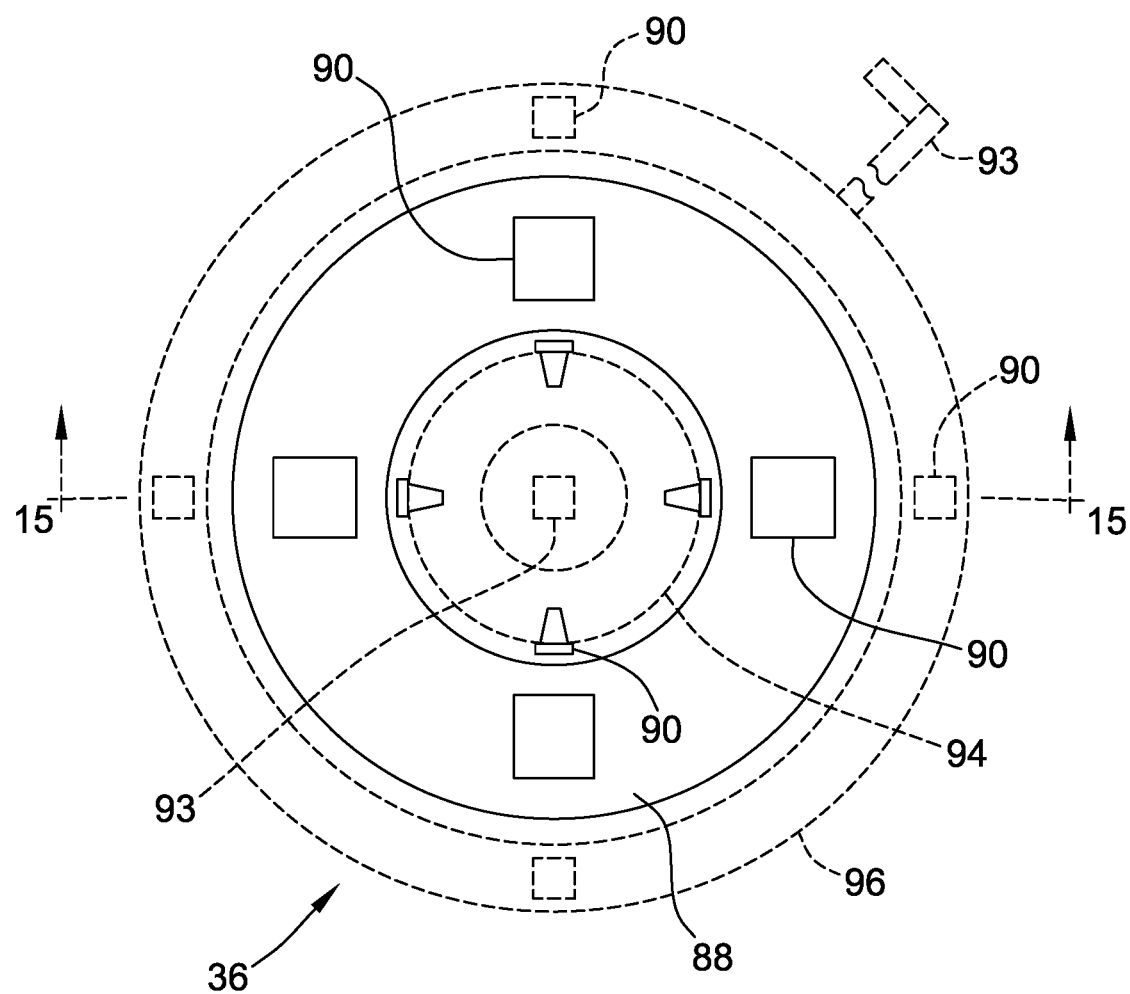
FIG. 14 is a top view of a device for providing a patterned orientation of magnetic particles for use in manufacturing a field oriented lamination, according to another embodiment of the present invention.
Figure 15:
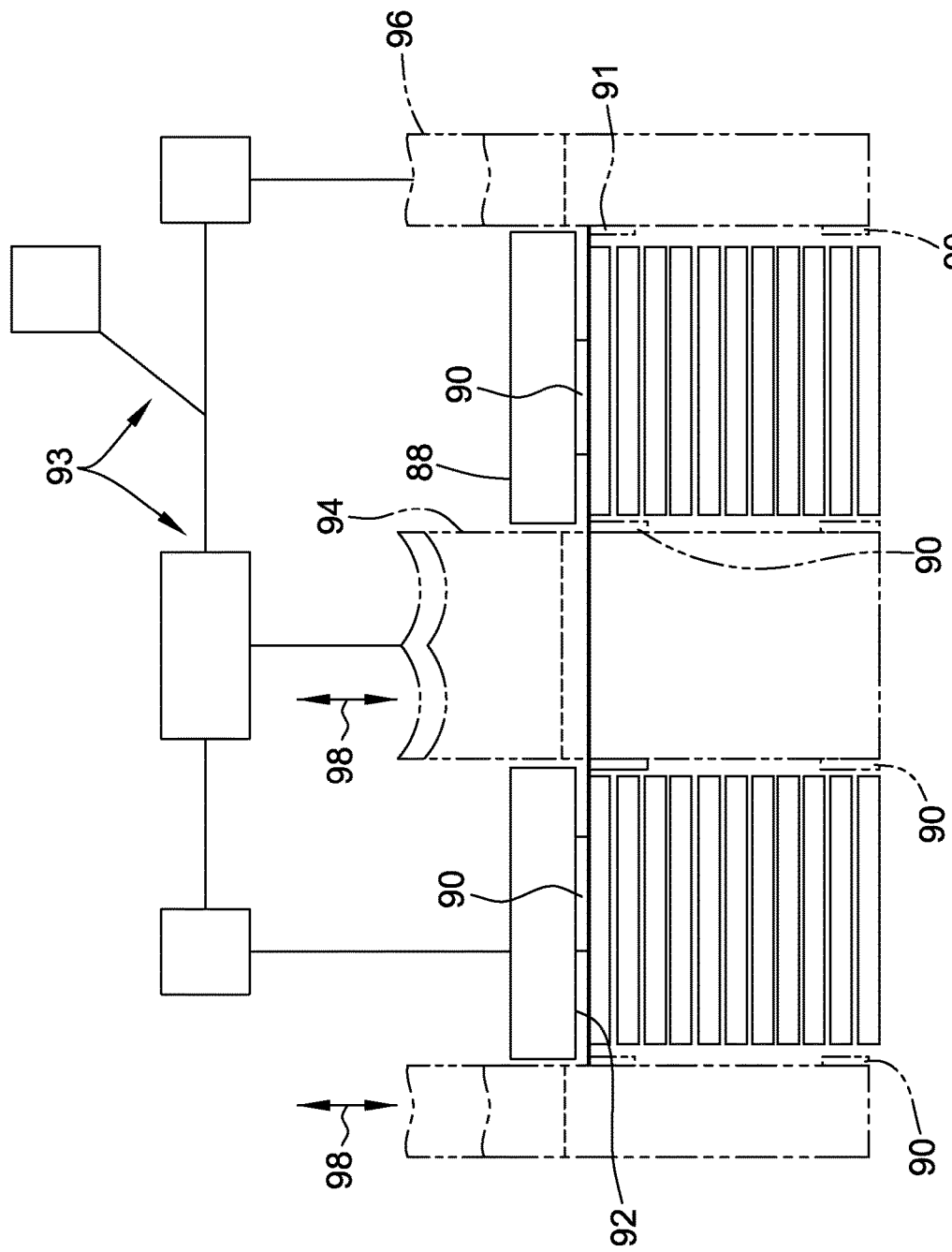
FIG. 15 is a cross sectional view of the device of FIG. 14 along the line 15-15 in the direction of the arrows.

Referring now to FIGS. 14 and 15 and according to another embodiment of the present invention, electromagnetic device 36 for providing an oriented field to magnetizable particles is shown in greater detail.

While the electromagnetic coil 34 (see FIGS. 3-6) may be sufficient to provide an electromagnetic field for generating an oriented field for the magnetizable particles that form the laminations, the position of the coil 34 below the platen 64 may limit the strength of the field and the consistency and accuracy of the magnetic field pattern, particularly after many lamination layers have been applied to the platen 64. Therefore positioning a magnetic field producing device adjacent the lamination layer as it is being formed is preferred. Such a position is a position of the electromagnetic device 36 above the layer being formed, opposed to the platen 64. The electromagnetic device 36 may be raised above the lamination layers when not being used to permit the carriage 68 to pass over the platen 64.

Referring again to FIGS. 14-15, the device 36 includes a body 88. The device 36 further includes a first magnetic field producing component 90 operable associated with the body 88. The magnetic field producing component 90 may be any component capable of producing a magnetic field. For example the magnetic field producing component 90 may be in the form of one or more permanent magnets or electromagnetic coils.

While the device 36 may include a solitary magnetic field producing component 90, to provide a desired magnet orientation shape or pattern, particularly a complicated pattern, such as that required for optimization of the performance and efficiency of the electric machine 12 a plurality of components 90 may be desired. The components 90 may be placed on surface 92 of body 88 facing the platen 64. The components 90 may be identical or may be different to assist in providing an improved magnetic field shape to the device 36. The components 90 may be small and may be placed in a pattern to obtain a desired magnetic flux pattern. Alternately, the components may be larger and have arcuate or more complex shapes in a pattern to obtain a desired magnetic flux pattern.

The device 36 may also include a shield 91, positioned between the platen 64 and the device 36 so that the particles are not attracted to the magnetic field producing component 90 and removed from their location on the platen 64.

As explained above the device 36 preferable includes a positioning apparatus 93 for providing a first position of the body 88 adjacent the upper lamination and a second position with the body positioned to permit the carriage 68 to perform its operations.

While the device 36 may be in the form of a base having a simple shape, for example a cylindrical shape corresponding to that of a lamination and having magnetic field producing components 90 extending from the planar surface 92 of the body, to provide a desired magnet orientation shape or pattern, particularly a complicated pattern, such as that required for optimization of the performance and efficiency of the electric machine 12, the device may include additional features to permit magnetic field producing components 90 to be positioned in orientations other than above the lamination 116.

For example and as shown in FIGS. 14-15, the device 36 may further include a stem 94 extending from the body 88. The stem 94 may be sized to permit the stem 94 to pass inside the circular central opening 30 of the laminations 116. One or more magnetic field producing components 90 may be operable associated with the stem 94. The magnetic field producing components 90 may be positioned on the outer periphery of the stem 94 oriented toward the circular central opening 30 of the laminations 116. The components 90 on stem 94 may be identical or may be different to other components 90 to assist in providing an improved magnetic field shape to the device 36.

For example and as shown in FIGS. 14-15, the device 36 alternately or in addition include a hub 96 extending from the body 88. The hub 96 may be sized to permit the hub 96 to pass outside the external periphery of the laminations 116. One or more magnetic field producing components 90 may be operable associated with the hub 96. The magnetic field producing component(s) 90 may be positioned on the inner periphery of the hub 96 oriented toward the circular outer periphery of the laminations 116. The components 90 on hub 96 may be identical or may be different to other components 90 to assist in providing an improved magnetic field shape to the device 36.

The stem 94 and/or the hub 96 may be fixedly secured to the base 88 or may be extendable downwardly from the base 88 in the direction of arrows 98 to permit the components 90 to access a deeper portion of the stator core 126 as more of the stator core 126 is completed by the printer 16.

Figure 16:
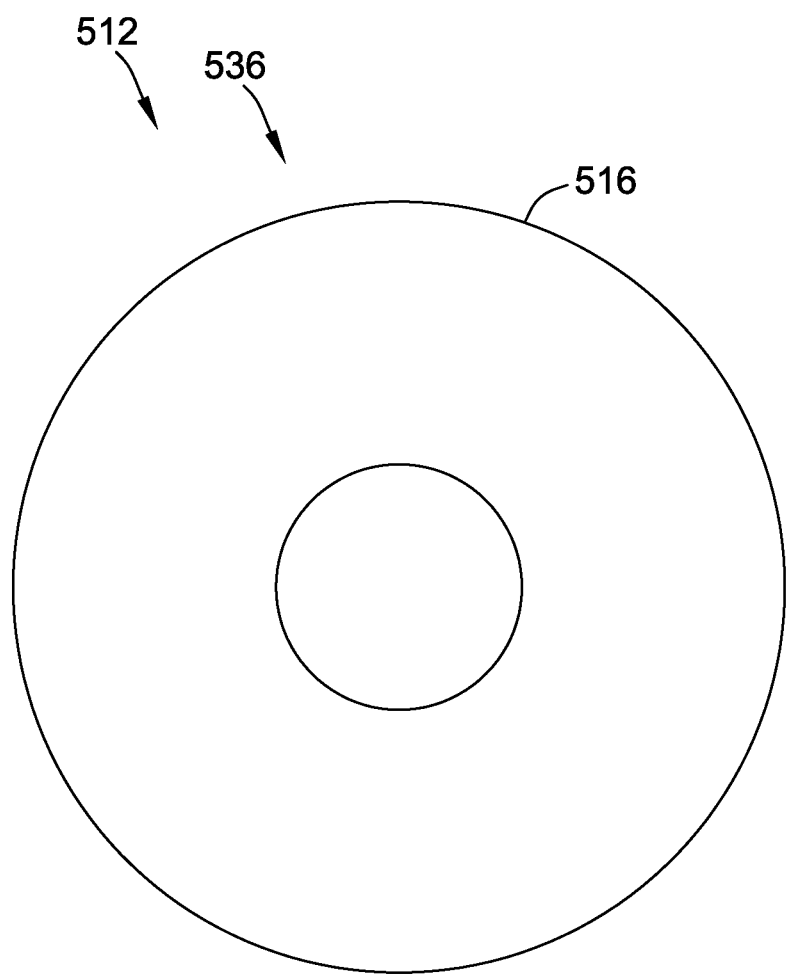
FIG. 16 is a plan view of another embodiment of the present invention in the form of a stack of laminations for use in a rotor in an electric machine.
Figure 17:
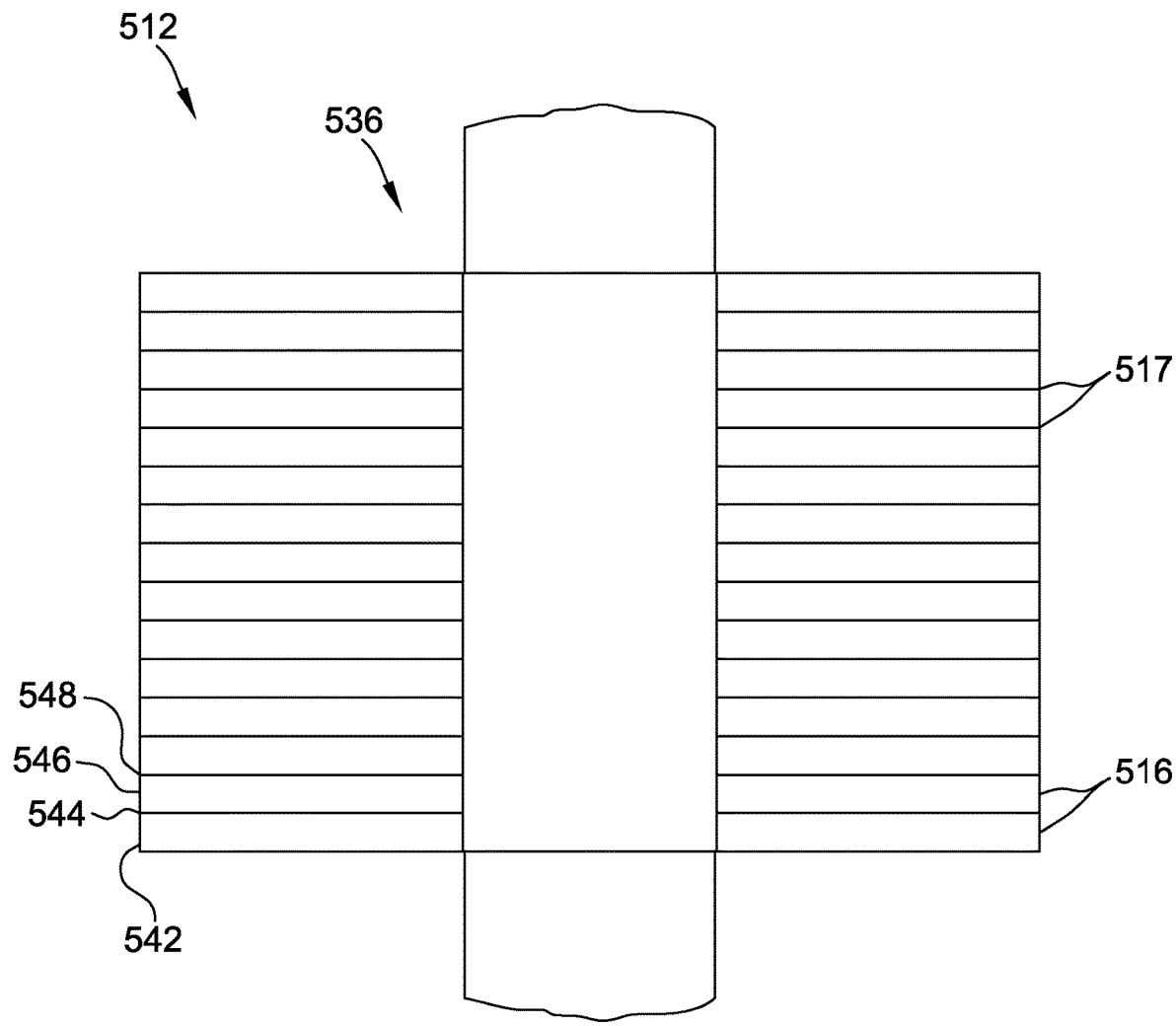
FIG. 17 is an end view of the stack of laminations of FIG. 16.

Referring now to FIGS. 16-17 and according to another embodiment of the present invention, an electric machine 512 is shown. The electric machine 512 is similar to electric machine 112 of FIGS. 7-9 except electric machine 512 includes a rotor core 536 that is different than rotor core 136 of electric machine 112. While rotor core 136 is made by conventional methods including assembling a plurality of stamped rotor core laminations 135 to form the rotor core 136, the rotor core 536 of electric machine 512 of FIGS. 16-17 includes rotor core laminations 516 which are made by a process such as 3D printing similar to that for producing the stator laminations 116 of the machine 112 of FIGS. 7-9.

The rotor core 536 includes a plurality of magnetically conductive layers or rotor core laminations 516, one of which can be seen in FIG. 16. It should be appreciated that each of the rotor core laminations 516 are separated by rotor boundary layers 517 (see FIG. 17), similar to the stator boundary layers 117 of machine 112 (see FIG. 9). The magnetically insulating material may surround the magnetically conductive material, particularly after being cured. By so surrounding the magnetically conductive material, magnetically insulating material may provide sufficient magnetic insulating properties that separate boundary layers of the magnetically insulating material above the magnetically conductive material may not be required.

It should be appreciate that the rotor core laminations 516 includes the magnetic field orientation process used in making stator laminations 116 of the stator core 126 of FIGS. 7-9.

Similar to the component 110 of FIGS. 7-9, a single thickness of magnetically conductive particles may be sufficient for a first rotor core lamination 542 of FIG. 16. It should be appreciated that successive layers of magnetically conductive particles may be applied over the first layer to provide a thicker thickness of magnetically conductive particles. After the first rotor core lamination 542 has its grains oriented, the first rotor core lamination 542 would be secured in position by one of a various alternate methods described above.

Referring again to FIG. 17, after the first rotor lamination 542 is secured into its position, a first rotor boundary layer 544 is applied onto the first rotor core lamination 542. Once the first rotor boundary layer 544 has been applied, the first rotor boundary layer 544 is secured to the first rotor lamination 542. The first rotor boundary layer 544 is preferably a magnetically insulating layer to reduce eddy current losses.

Continuing to refer to FIG. 17, once the first rotor boundary layer 544 has been cured or activated, a second rotor core lamination 546 is applied to the first rotor boundary layer 544. The second rotor core lamination 546 is preferably similar or identical to the first rotor core lamination 542 and is made in a process similar to that by which the first rotor core lamination 542 is made.

Once the second rotor core lamination 546 has been cured or activated, a second rotor boundary layer 548 is applied to the second rotor lamination 546. The second rotor boundary layer 548 is preferably similar or identical to the first rotor boundary layer 544 and is made in a process similar to that by which the first rotor boundary layer 544 is made. This process is repeated until enough rotor laminations 516 separated by rotor boundary layers 517 are made to provide a rotor core 536 of sufficient length.

Once the rotor core 536 is completed a shaft (not shown) similar to shaft 138 of machine 112 of FIGS. 7-9 is inserted in central opening of core 526. For permanent magnet machines, permanent magnets (not shown) are secured to the outer periphery of rotor core 526.

Figure 18:
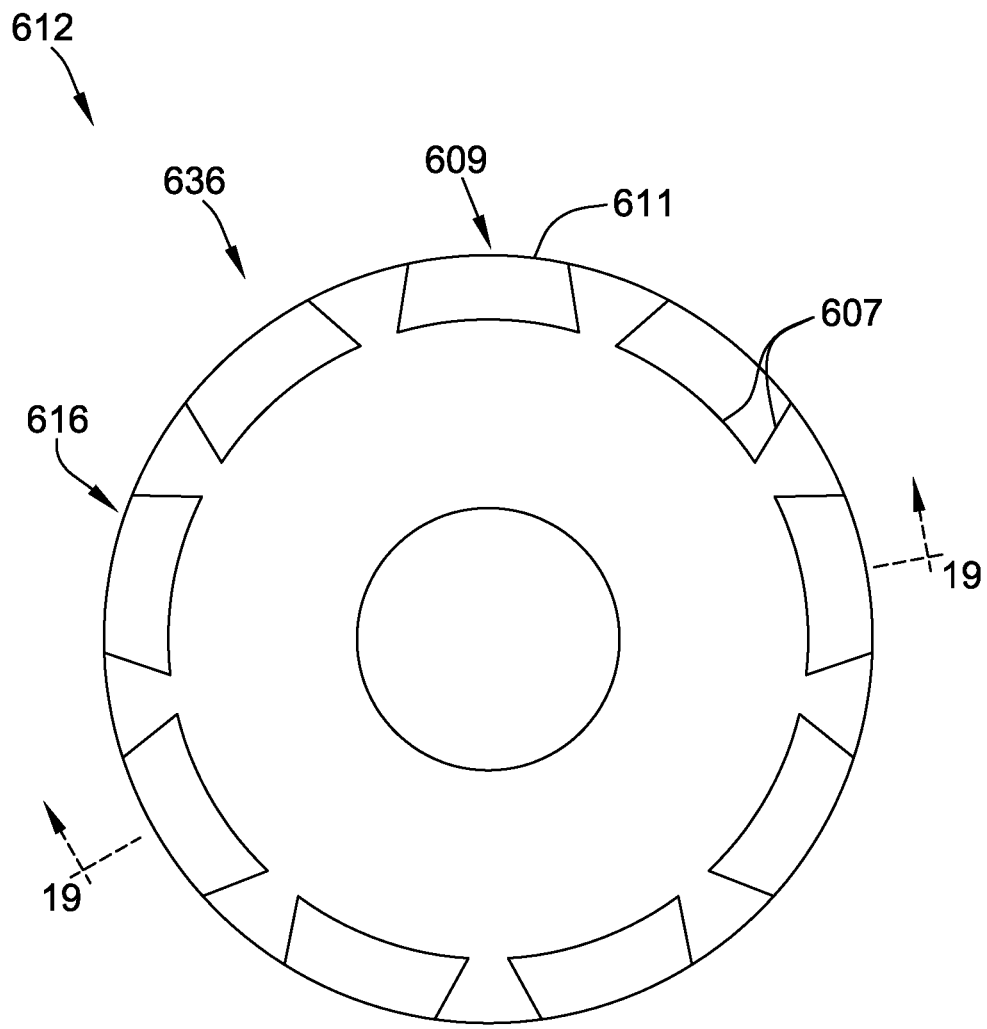
FIG. 18 is a plan view of another embodiment of the present invention in the form of a stack of laminations with permanent magnet pockets for use in a rotor with permanent magnets in a electric machine.
Figure 19:
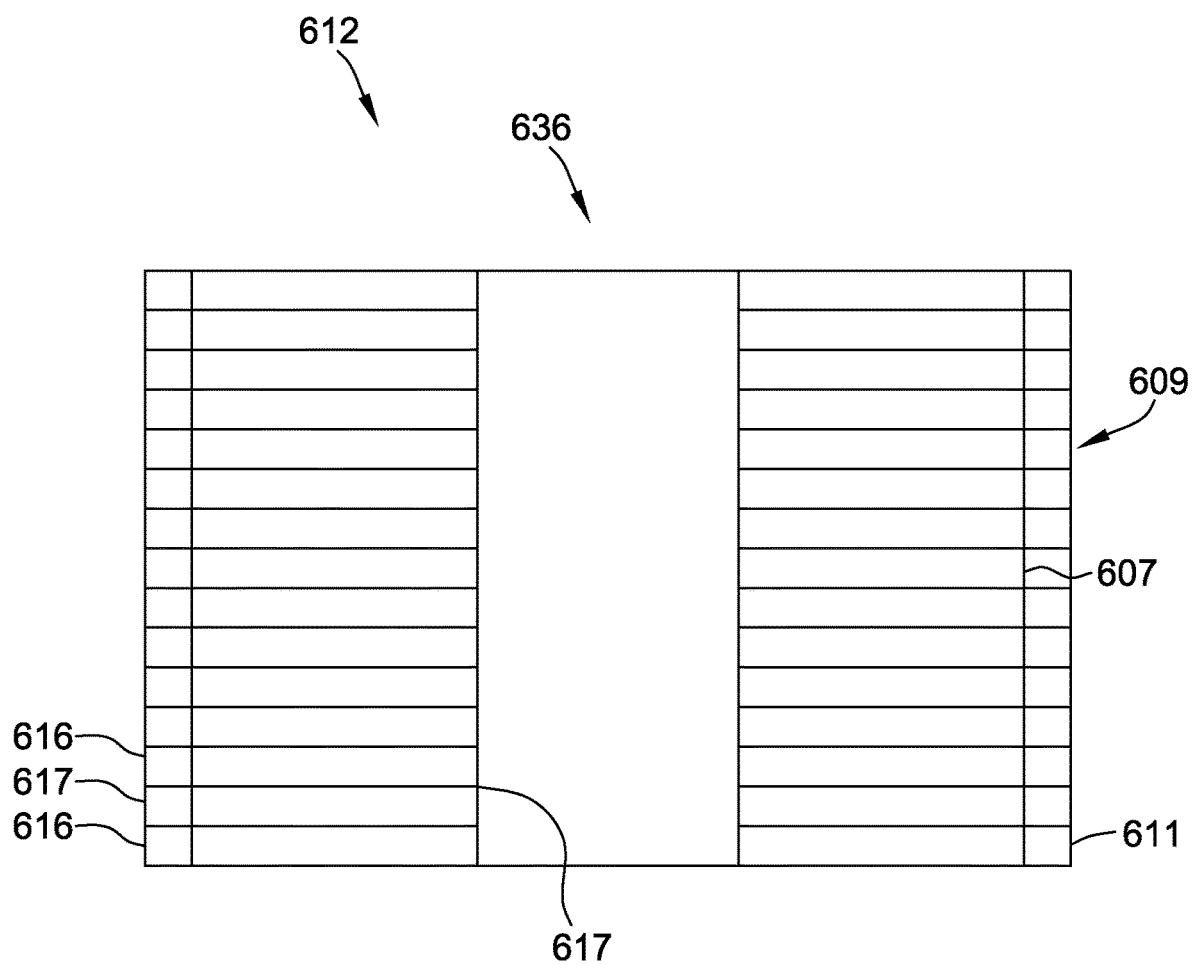
FIG. 19 is an end view of the stack of laminations of FIG. 18.

Referring now to FIGS. 18-19 and according to another embodiment of the present invention, an electric machine 612 is shown. The electric machine 612 is similar to electric machine 512 of FIGS. 16-17 except electric machine 612 includes a rotor core 636 that is different than rotor core 536 of electric machine 512.

Both the rotor core 536 of FIGS. 16-17 and the rotor core 636 of FIGS. 18-19 may use a process such as 3D printing similar to that for producing the stator laminations 116 of the machine 112 of FIGS. 7-9, however laminations 616 of the rotor core 636 further include surfaces 607 which form pockets 609 in the lamination 616 for receiving permanent magnets 611.

While the permanent magnets 611 may be separate components that are assembled into the pockets 609 after the pockets 609 are formed, preferably the permanent magnets 611 are applied by a process such as 3D printing similar to that for producing the stator laminations 116 of the machine 112 of FIGS. 7-9. For example, magnetic particles (not shown) may be positioned in a separate compartment (not shown) in the printer 14 (see FIGS. 3-6). The magnetic particles may be applied to each layer as the printer prints the layer of the laminations of the electric machine. The magnetic particles may be permanent magnet materials, for example, neodymium or cobalt.

The rotor core 636 includes a plurality of magnetically conductive layers or rotor core laminations 616, one of which can be seen in FIG. 18. It should be appreciated that each of the rotor core laminations 616 are separated by rotor boundary layers 617 (see FIG. 19), similar to the rotor boundary layers 517 of machine 512 (see FIG. 17). The magnetically insulating material may surround the magnetically conductive material, particularly after being cured. By so surrounding the magnetically conductive material, magnetically insulating material may provide sufficient magnetic insulating properties that separate boundary layers of the magnetically insulating material above the magnetically conductive material may not be required.

Figure 20:
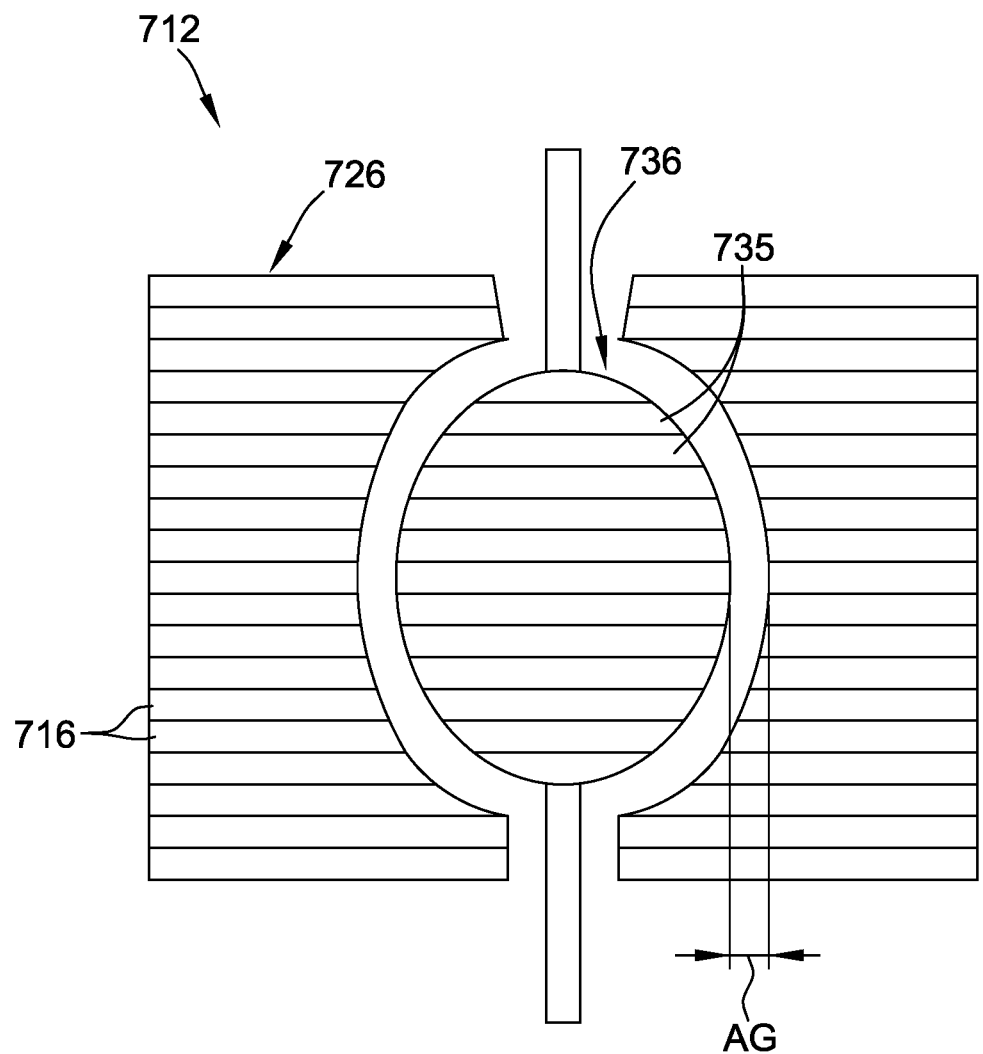
FIG. 20 is a plan view in cross section of an interlocking rotor core and stator core combination, according to another embodiment of the present invention.

Referring now to FIG. 20 and according to another embodiment of the present invention, an electric machine 712 is shown. The electric machine 712 includes both a stator core 726 and a rotor core 736 which are made by a process such as 3D printing similar to that for producing the stator laminations 116 of the machine 112 of FIGS. 7-9.

As shown in FIG. 20, the stator core 726 includes a series of stator laminations 716 that create a barrel shaped central opening for receiving the barrel shaped rotor core 736. The rotor core 736 includes a series of rotor laminations 735 that create the barrel shaped rotor core 736. It should be appreciate that alternate, non-cylindrical shapes for the bore of the stator and the periphery of the rotor may be used. For example, the bore and periphery may be tapered, frustoconical, spherical, toroid, concave, convex, or have any geometric or non geometric shape or combination thereof.

It should be appreciated that each layer of the stator core 726 and the rotor core 736 are formed on the platen 64 (see FIGS. 3-6) together so that, once the printing process is complete, the rotor core 736 is secured within the stator core 726. During the printing process a low melting point material, such as a polymer, may be placed in the gap between the outside of the rotor core 736 and the inside of the stator core 726 to provide for a stable assembly. During motor manufacture, the low melting point material may be melted to separate the rotor core 736 from the stator core 726.

Air gap AG between the outside of the rotor core 736 and the inside of the stator core 726 may be constant or it may vary along the longitudinal axis of the stator core 726 or along rotational axis of the rotor core 736. For example, the air gap AG may be smallest in the center of the rotor core 736 and the stator core 726 and may became larger towards the edges. The air gap AG is, however generally constant along any position along the rotational axis of the rotor core 736.

Figure 21:
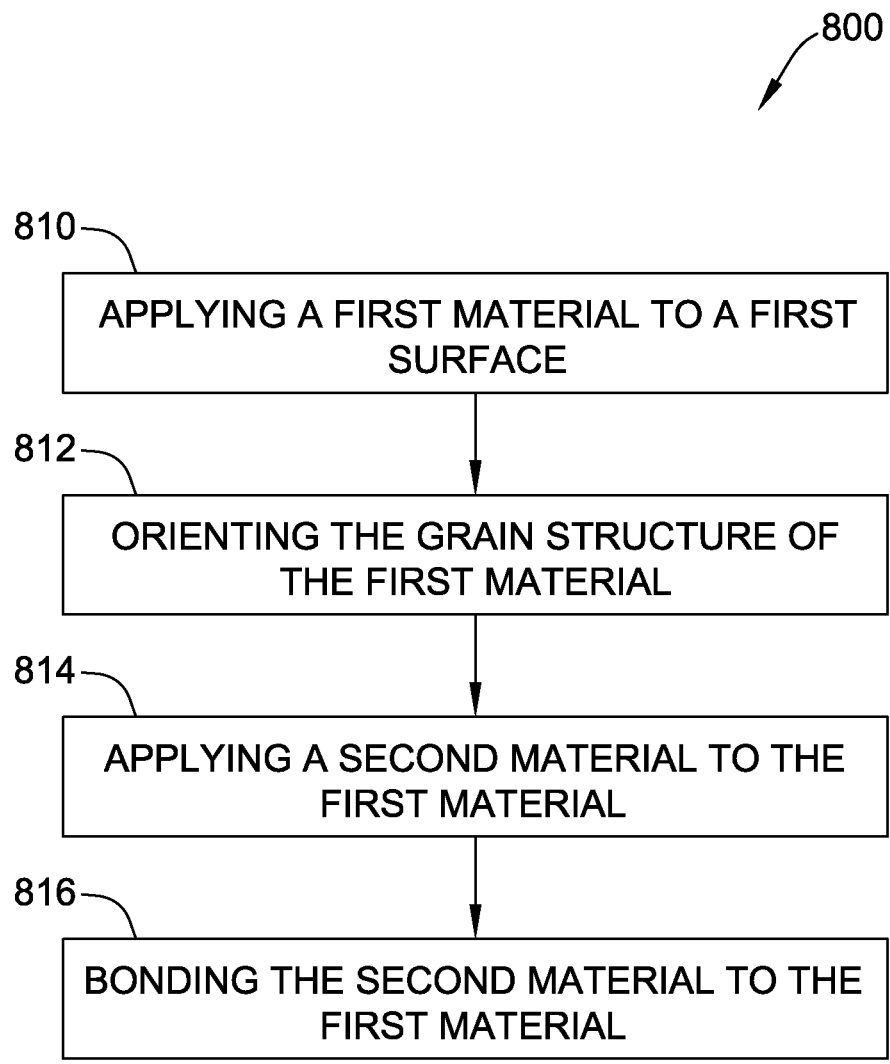
FIG. 21 is a flow chart of another exemplary method for providing a component according to the present invention.

Referring now to FIG. 21 and according to another embodiment of the present invention, a method 800 for making a component 10 (see FIGS. 1-2) for use in an electric machine 12 (see FIGS. 1-2) is provided. The method 800 includes step 810 of applying a first material 20 (see FIGS. 1-2) to a first surface 18 (see FIGS. 1-2) and step 812 of orienting the grains of the first material. The method 800 further includes the step 814 of applying a second material 38 (see FIGS. 1-2) to the first material 20 and the step 816 of bonding the second material 38 to the first material 20.

It should be appreciated that the method 800 may further include the step of applying an insulating layer to the second material.

Figure 22:
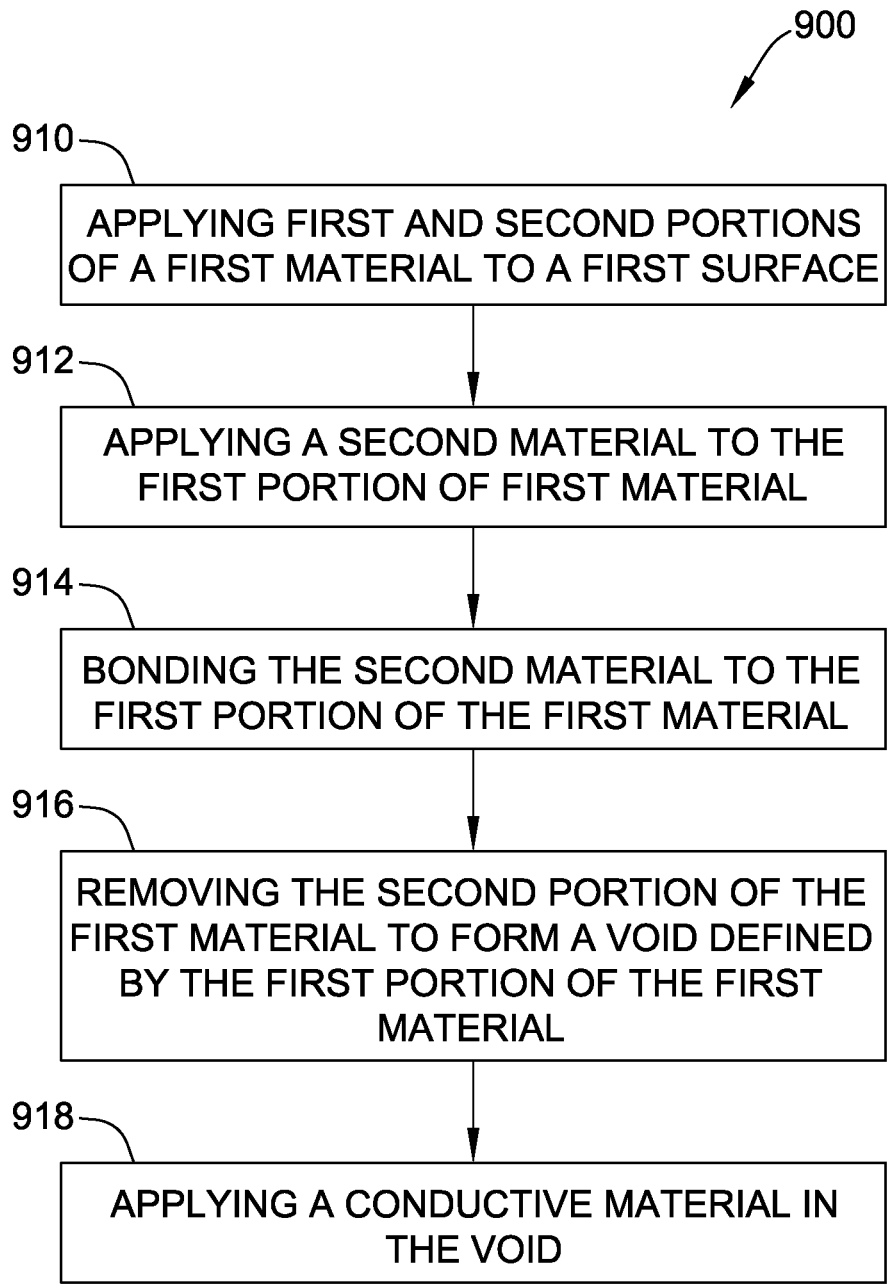
FIG. 22 is a flow chart of another exemplary method for providing a component with coils according to the present invention.

Referring now to FIG. 22 and according to another embodiment of the present invention, a method 900 for making a component 210 (see FIGS. 10-11) for use in an electric machine 212 (see FIGS. 10-11) is provided. The method 900 includes step 910 of applying first and second portions of a first material (see FIGS. 10-11) to a first surface (see FIGS. 10-11). The method 900 also includes step 912 of applying a second material (see FIGS. 10-11) to the first portion of the first material. The method 900 also includes step 914 of bonding the second material to the first portion of the first material. The method 900 also includes step 916 of removing the second portion of the first material form a void 250 defined by the first portion of the first material. The method 900 also includes step 918 of applying a conductive material in the void.

As shown in FIGS. 23, 23A, 23B and 23C and according to another embodiment of the present invention, an electric machine 1000 is provided. Hereinafter the electric machine 1000 will be described as an electric motor but the process is equally well suited for electric generators. The electric motor 1000 is prepared by a process including the steps of applying at least one of a plurality of materials to a first surface to form a first electric motor layer and applying at least one of a plurality of materials to a surface of first electric motor layer to form a second electric motor layer.

Figure 23:
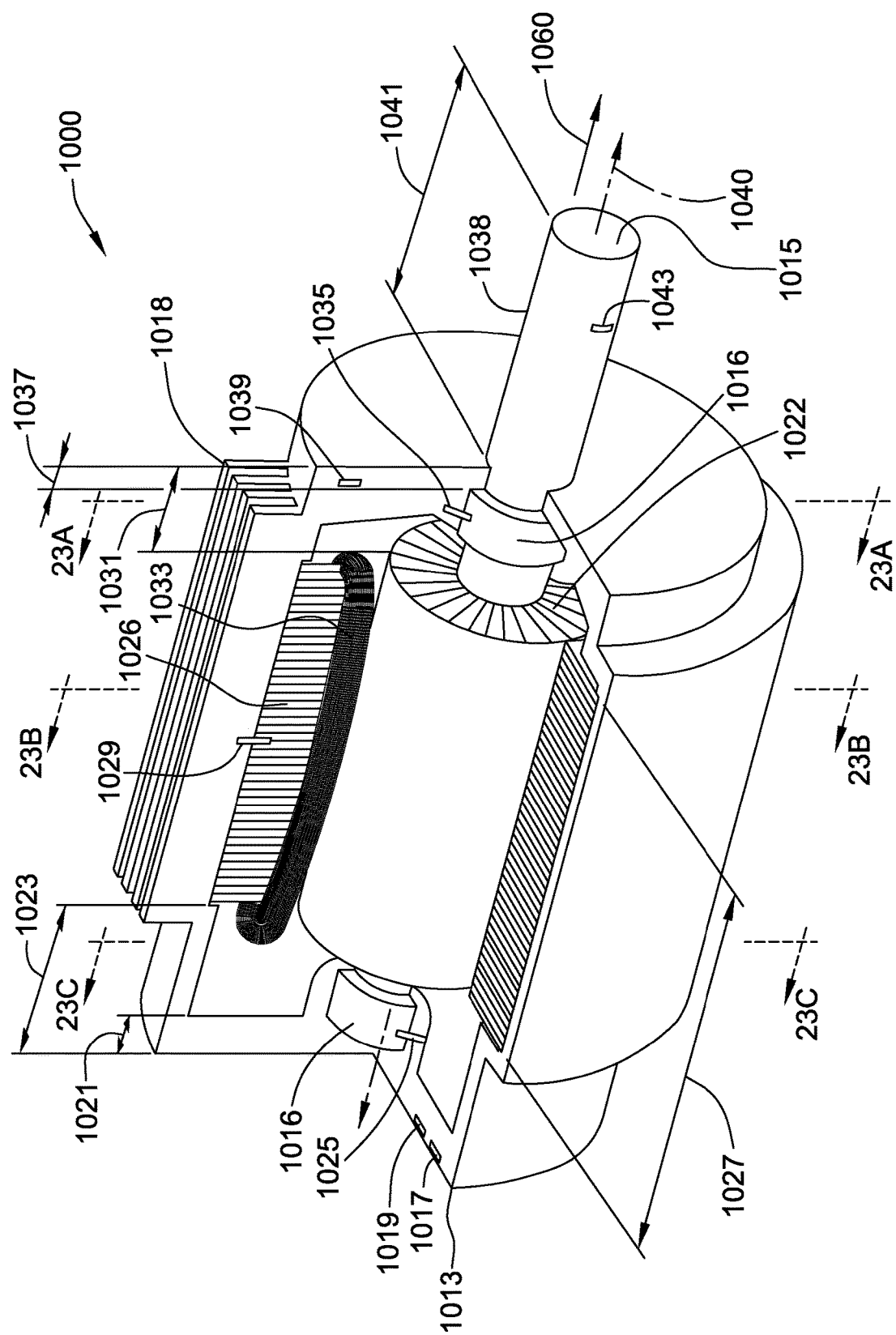
FIG. 23 is a perspective view of another embodiment of the present invention in the form of a printed electric machine.

For example and as shown in FIG. 23, the motor 1000 is printed by starting at first end 1013 of motor 100 and applying layer after layer to the motor, building the motor from first end 1013 to the opposed second end 1015 of the motor 1000 in the direction of arrow 1060 along axis 1040. The motor 1000 includes a series of zones, each zone having a particular cross section made of one or more different materials.

Referring again to FIG. 2, First layer 1017, starting from first end 1013 is made by applying a first material 1020 to a first portion of the first surface 18 of printer 14 to form the first layer 1017. While the first portion of the first surface 18 may be the entire first surface, preferably the first portion corresponds to the first layer 1017 and corresponds to the shape of motor 1000 at the first end 1013 of motor 1000, which as shown is circular and is similar to the shape shown in FIG. 23C, except it does not include a shaft.

For example, the entire first surface 18 of printer 14 may receive the first material 1020 and a bonding agent 1014 may be applied to the first portion of the first surface 18 in the desired shape. Later, the first material 1020 located outside the first portion may be removed from the first surface 18, resulting in the first material 1020 in the desired shape. Next a bonding agent 1014 may be applied to the first layer 1017 and a second layer 1019 may be appled to the first layer is a similar fashion to that in which the first layer 1017 was applied.

As shown in FIG. 23, this process is repeated until first zone 1021 is completely printed. Note that the first zone 1021 represents a portion of housing 1018 of the motor 1000.

Figure 23A:
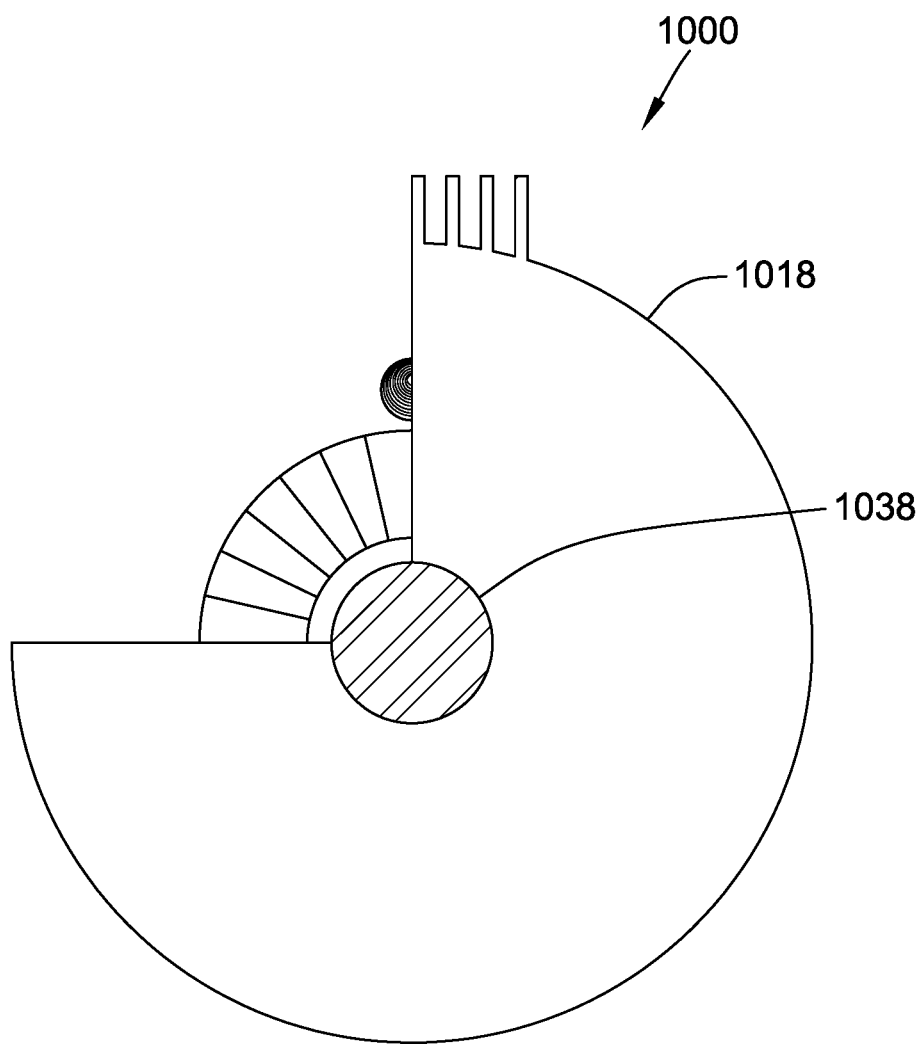
FIG. 23A is a cross sectional view of the machine of FIG. 23 along the line 23A-23A in the direction of the arrows.
Figure 23B:
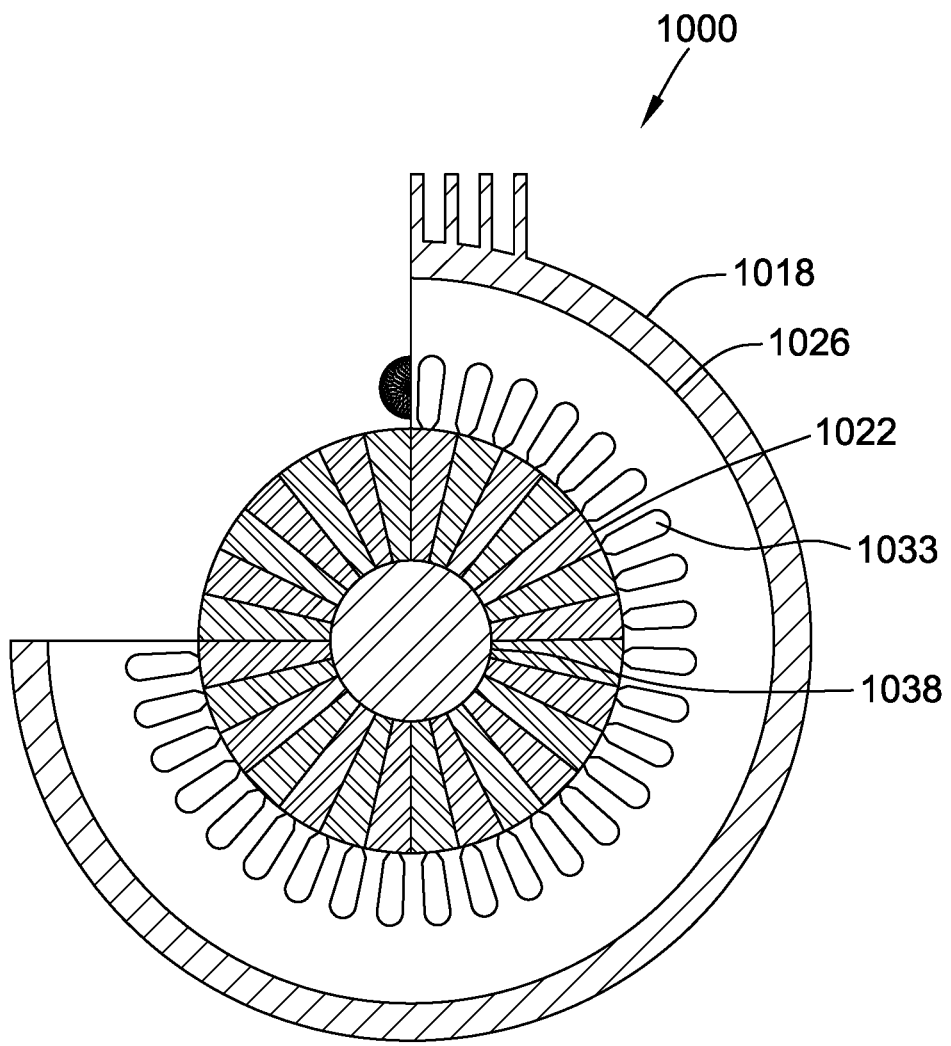
FIG. 23B is a cross sectional view of the machine of FIG. 23 along the line 23B-23B in the direction of the arrows.
Figure 23C:
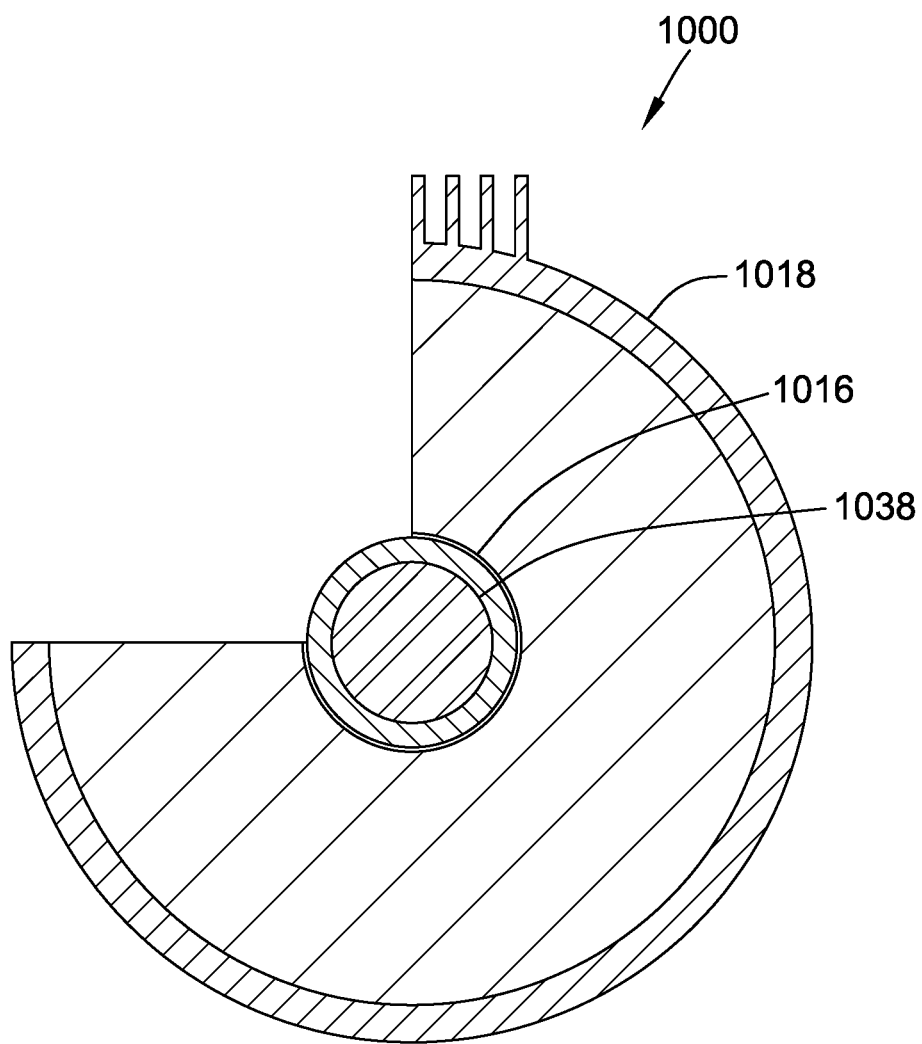
FIG. 23C is a cross sectional view of the device of FIG. 23 along the line 23C-23C in the direction of the arrows.

Next, second zone 1023 is printed by a similar process. A cross section of zone 1023 is shown in FIG. 23C. Note that the layers in zone 1023 include housing 1018, bearing 1016 and shaft 1038. For example one layer 1025 of zone 1023 includes housing 1018, bearing 1016 and shaft 1038. Preferably housing 1018 is made of a different material than bearing 1016. The layer 1025 may be applied by applying the housing portion first and then applying the other portions, or by applying them as one layer as that portion of the layer is applied. This process is repeated until second zone 1023 is completely printed.

Next, third zone 1027 is printed by a similar process. A cross section of zone 1027 is shown in FIG. 23B. Note that the layers in zone 1027 include housing 1018, stator 1026, wire 1033, rotor 1022, and shaft 1038. For example one layer 1029 of zone 1027 includes housing 1018, stator 1026, wire 1033, rotor 1022, and shaft 1038. Preferably several of these components are made of different materials than the others. The layer 1029 may be applied by applying one of the housing, stator, wire, rotor, and shaft portions first and then applying the other portions, or by applying them as one layer as that portion of the layer is applied. This process is repeated until third zone 1027 is completely printed.

Next, fourth zone 1031 is printed by a similar process. A cross section of zone 1031 is similar that of zone 1023 which is shown in FIG. 23C. Note that the layers in zone 1031 include housing 1018, bearing 1016 and shaft 1038. For example one layer 1035 of zone 1031 includes housing 1018, bearing 1016 and shaft 1038. Preferably housing 1018 is made of a different material than bearing 1016. The layer 1035 may be applied by applying the housing portion first and then applying the other portions, or by applying them as one layer as that portion of the layer is applied. This process is repeated until fourth zone 1031 is completely printed.

Next, fifth zone 1037 is printed by a similar process. A cross section of zone 1037 *i* is shown in FIG. 23A. Note that the layers in zone 1037 include housing 1018 and shaft 1038. For example one layer 1039 of zone 1037 includes housing 1018 and shaft 1038. The housing 1018 may be made of a different material than shaft 1038. The layer 1039 may be applied by applying the housing portion first and then applying the shaft, or by applying them as one layer as that portion of the layer is applied. This process is repeated until fifth zone 1039 is completely printed.

Next, sixth zone 1041 is printed by a similar process. Note that the layers in zone 1041 include shaft 1038. For example one layer 1043 of zone 1037 includes shaft 1038. One layer 1043 is first applied. This process is repeated until sixth zone 1041 is completely printed.

After all six zones 1021, 1023, 1027, 1031, 1037 and 1041 are printed the motor 1000 has been printed.

The hopper 72 of the printer 14 of FIG. 5 that may be used to print the electric machine 1000 may include a plurality of compartments (not shown), one compartment for each different material. Alternatively, a plurality of hoppers may be used. Material from a selected one of the compartments or hoppers would be applied as needed. Since the electric machine has a variety of dissimilar components, the printer would be capable of printing a variety of materials that may include, for example, copper, aluminum, adhesives, resins, electrically insulative materials, electrically conductive materials, magnetically insulative materials, magnetically conductive materials, polymers, metals and composites.

The methods, systems, and apparatus described herein facilitate efficient and economical assembly of an electric motor. Exemplary embodiments of methods, systems, and apparatus are described and/or illustrated herein in detail. The methods, systems, and apparatus are not limited to the specific embodiments described herein, but rather, components of each apparatus and system, as well as steps of each method, may be utilized independently and separately from other components and steps described herein. Each component, and each method step, can also be used in combination with other components and/or method steps.

When introducing elements/components/etc. of the methods and apparatus described and/or illustrated herein, the articles "a", "an", "the", and "the" are intended to mean that there are one or more of the element(s)/component(s)/etc. The terms "comprising", "including", and "having" are intended to be inclusive and mean that there may be additional element(s)/component(s)/etc. other than the listed element(s)/component(s)/etc.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

Described herein are exemplary methods, systems and apparatus utilizing a core manufacturing process that reduces the core efficiency loss caused by the thicker laminations and that improves efficiency by providing magnetically oriented laminations. Furthermore, the exemplary methods system and apparatus achieve increased efficiency while reducing manufacturing costs. The methods, system and apparatus described herein may be used in any suitable application. For example, they are suited for gear boxes, fans, blowers, HVAC and pump applications.

Exemplary embodiments of the electric machine components and systems are described above in detail. The electric motor and its components are not limited to the specific embodiments described herein, but rather, components of the systems may be utilized independently and separately from other components described herein. For example, the components may also be used in combination with other motor systems, methods, and apparatuses, and are not limited to practice with only the systems and apparatus as described herein. Rather, the exemplary embodiments can be implemented and utilized in connection with many other applications.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for making a component for use in an electric machine, the method comprising the steps of:
   applying first and second portions of a first material having an orientable grain structure to a first surface;
   applying a second material to the first portion of first material;
   bonding the second material to the first portion of the first material;
   removing the second portion of the first material to form a void defined by the first portion of the first material;
   applying an electrically conductive material in the void;
   wherein the applying the first and second portions, applying the second material, bonding the second material, removing the second portion and applying the electrically conductive material in the void are repeated several times;
   wherein the component comprises a stator; and
   wherein the electrically conductive material comprises an electrical conduit forming an electromagnetic coil.

2. The method of claim 1, further comprising the step of orienting the grain structure of the first material in a patterned orientation prior to bonding the second material to the first portion of the first material.

3. The method of claim 1, further comprising applying an insulating layer to the second material.

4. The method of claim 1, further comprising:
   applying a third material having an orientable grain structure to the first material;
   applying a fourth material to the third material; and
   bonding the fourth material to the third material.

5. The method of claim 4, wherein the first material and the third material are substantially the same.

6. The method of claim 4, further comprising applying an insulating layer to the fourth material.

7. The method of claim 1, wherein the first material comprises magnetically conductive material particles.

8. The method of claim 1, wherein the step of applying the first material to the first surface is done so in an orientation to create a desired magnetic field pattern.

9. A method for making a component for use in an electric machine, the method comprising the steps of:
   applying first and second portions of a first material having an orientable grain structure to a first surface;
   applying a second material to the first portion of first material;
   bonding the second material to the first portion of the first material;
   removing the second portion of the first material to form a void defined by the first portion of the first material;
   applying a third material having an orientable grain structure to the first material;
   applying a fourth material to the third material; and
   bonding the fourth material to the third material;
   applying an insulating layer to the fourth material;
   wherein the applying the third material having an orientable grain structure to the first material, applying the fourth material to the third material, bonding the fourth material to the third material, and applying the insulating layer to the fourth material are repeated several times; and
   wherein the component comprises a rotor.

10. The method of claim 9, further comprising the step of orienting the grain structure of the first material in a patterned orientation prior to bonding the second material to the first portion of the first material.

11. The method of claim 9, further comprising applying an insulating layer to the second material.

12. The method of claim 9, wherein the first material and the third material are substantially the same.

\* \* \* \* \*